(12) United States Patent
Karihara et al.

(10) Patent No.: US 9,079,053 B2
(45) Date of Patent: Jul. 14, 2015

(54) WATER FLOW DETECTION DEVICE

(75) Inventors: Yukinori Karihara, Tokyo (JP);
Ryoutarou Chiba, Tokyo (JP); Satoshi Harada, Tokyo (JP); Zenkou Obara, Tokyo (JP); Daisuke Yaegashi, Tokyo (JP); Shigeo Sugawara, Tokyo (JP); Akira Onodera, Tokyo (JP)

(73) Assignee: Senju Sprinkler Co., Ltd., Tokyo (JP)

( * ) Notice: Subject to any disclaimer, the term of this patent is extended or adjusted under 35 U.S.C. 154(b) by 742 days.

(21) Appl. No.: 13/376,215

(22) PCT Filed: Jun. 15, 2010

(86) PCT No.: PCT/JP2010/060114
§ 371 (c)(1),
(2), (4) Date: Dec. 5, 2011

(87) PCT Pub. No.: WO2010/147112
PCT Pub. Date: Dec. 23, 2010

(65) Prior Publication Data
US 2012/0103637 A1 May 3, 2012

(30) Foreign Application Priority Data
Jun. 17, 2009 (WO) .................. PCT/JP2009/061052

(51) Int. Cl.
*F16K 31/06* (2006.01)
*A62C 35/68* (2006.01)
(Continued)

(52) U.S. Cl.
CPC ............. *A62C 35/68* (2013.01); *F16K 37/0041* (2013.01); *G08B 17/04* (2013.01)

(58) Field of Classification Search
CPC ..... F16K 37/0041; G08B 17/04; A62C 35/68
USPC .................. 169/19, 23; 137/553, 527, 527.8, 137/543–543.23, 554, 521; 251/66–68; 73/1.57, 1.73
See application file for complete search history.

(56) References Cited

U.S. PATENT DOCUMENTS

2007/0095406 A1* 5/2007 Colton et al. ................. 137/553

FOREIGN PATENT DOCUMENTS

| CN | 2784029 Y | 5/2006 |
|---|---|---|
| JP | 09-103515 A | 4/1997 |

(Continued)

OTHER PUBLICATIONS

International Search Report for PCT Patent App. No. PCT/JP2010/060114 (Jul. 13, 2010).

(Continued)

*Primary Examiner* — Melanie Tyson
*Assistant Examiner* — Viet Le
(74) *Attorney, Agent, or Firm* — Cermak Nakajima & McGowan LLP; Tomoko Nakajima

(57) ABSTRACT

The present invention realizes a new actuated valve type water flow detection device that can be applied to a pipe with a relatively large bore diameter. The water flow detection device A includes a coil spring for urging a detection rod in an opening direction of a valve body. Therefore, while detecting water flow by linking a rotation of the detection rod 11 to a rotation of the valve body when the valve body opens or closes by a differential pressure, the detection rod does not apply a closing load to the valve body that is released. Therefore, even when the rotation of the valve body is small because the water flow in the secondary side is small in a conventional actuated valve type water flow detection device, it is possible to increase an opening angle of the valve body.

28 Claims, 20 Drawing Sheets

(51) Int. Cl.
   *G08B 17/04*   (2006.01)
   *F16K 37/00*   (2006.01)

(56) References Cited

FOREIGN PATENT DOCUMENTS

| JP | 2001-000574 A | | 1/2001 | |
|---|---|---|---|---|
| JP | 2005-253640 A | | 9/2005 | |
| JP | 2006-055400 A | | 3/2006 | |
| JP | 2007-003377 A | | 1/2007 | |
| JP | 2007-050067 A | | 3/2007 | |
| JP | 2007050067 A | * | 3/2007 | ............ A62C 35/68 |

OTHER PUBLICATIONS

Office Action for Chinese Patent App. No. 201080027388.4 (May 15, 2014).

\* cited by examiner (a)  (b)

WATER FLOW DETECTION DEVICE

This application is a national phase entry under 35 U.S.C. §371 of PCT Patent Application No. PCT/JP2010/060114, filed on Jun. 15, 2010, which claims priority under 35 U.S.C. §119 to PCT Patent Application No. PCT/JP2009/061052, filed Jun. 17, 2009, both of which are incorporated by reference.

TECHNICAL FIELD

The present invention relates to a water flow detection device which is installed in a pipe in a fire extinguishing system and detects water flow in the pipe filled with water to output a signal, and in particular to an actuated valve type water flow detection device which mechanically detects a differential pressure generated between the primary side and the secondary side of a valve body when water flows and outputs a signal such as a fire signal and an alarm signal.

BACKGROUND ART

The water flow detection device is installed in a pipe in a fire extinguishing system such as a sprinkler system and a foam extinguishing system and detects water flow in the pipe to output a predetermined signal (fire signal, alarm signal). Inside of the water flow detection device is a check valve structure and divided into a primary chamber and a secondary chamber by the valve body. The valve body is in a closed state in which the primary chamber and the secondary chamber are separated from each other at all times. The primary chamber and the secondary chamber are filled with water at all times. A pipe connected to the primary chamber is connected to a water source such as a water tank and a pipe connected to the secondary chamber is connected to a spray head such as a sprinkler head and a foam head.

There are various water flow detection devices according to a detection method. For example, an actuated valve type water flow detection device is known which mechanically detects a differential pressure generated between the primary side and the secondary side of the valve body when water flows and outputs a signal such as a fire signal and an alarm signal. The water flow detection device has various advantages. For example, the amount of water flow for actuating the valve to output an alarm is constant and stable, there is no water path connected to another system, such as an alarm water path of an automatic alarm valve type water flow detection device, so that no influence such as reverse flow is exerted from other systems, and the device can be formed simply (see Patent Document 1 as an example of a conventional automatic alarm valve type water flow detection device).

Patent Document 1: Japanese Unexamined Patent Application Publication No. 09-103515

DISCLOSURE OF INVENTION

Problem to be Solved by the Invention

The actuated valve type water flow detection device having such advantages has a problem not to be able to be realized as a water flow detection device with a relatively large bore diameter (for example, 65 A to 200 A) installed in a general building. Specifically, when many sprinkler heads are installed as in a general building, a differential pressure generated between the primary side and the secondary side of the valve body when water flows from the sprinkler heads is very small. Further, the larger the bore diameter of the water flow detection device is and the larger the amount of water flow is, the smaller the differential pressure is. When the differential pressure becomes small, the rotation angle of the valve body becomes small, so that it is difficult to correctly detect water flow from the sprinkler heads by the rotation angle of the valve body. Therefore, although the conventional actuated valve type water flow detection device has many technical advantages described above, the conventional actuated valve type water flow detection device is actually used only as a water flow detection device with a relatively small bore diameter, and the automatic alarm valve type water flow detection device is still used as a water flow detection device with a relatively large bore diameter installed in a general building.

The present invention is made in view of the conventional technique as described above. An object of the present invention is to provide a new actuated valve type water flow detection device that can be applied to a pipe with a relatively large bore diameter.

Means for Solving the Problem

In order to solve the above problem, the present invention provides a water flow detection device described below.

The present invention is a water flow detection device including a cylindrical main body connected to a pipe of a fire extinguishing system, a valve body having a check valve structure provided inside the main body, and a switch device for detecting water flow by a rotation of the valve body and outputting a predetermined signal. The water flow detection device is characterized by including a detection rod whose one end is in contact with a portion of the valve body opposite to a bearing of the valve body and which switches ON/OFF of the switch device when the valve body rotates in an opening direction, and an urging member for urging the detection rod in the opening direction of the valve body.

The water flow detection device of the present invention includes a detection rod whose one end is in contact with a portion of the valve body opposite to a bearing of the valve body and which switches ON/OFF of the switch device in conjunction with a rotation of the valve body in the opening direction. The urging member urges the detection rod in the opening direction of the valve body. Therefore, even when the rotation of the valve body is small because the water flow in the secondary side is small in a conventional actuated valve type water flow detection device, in the present invention, a closing load applied to the valve body is reduced by urging the valve body by the urging member via the detection rod, so that it is possible to increase an opening angle of the valve body and to mechanically and accurately detect the water flow by the rotation of the valve body.

One end portion of the detection rod is in contact with the valve body at a position opposite to the bearing of the valve body. Therefore, even when the rotation of the valve body is small in a water flow detection device having a large bore diameter, the detection rod is in contact with a portion of the valve body opposite to the bearing of the valve body, so that the detection rod can be rotated in conjunction with a portion moving largely in the valve body and the movement of the valve body can be accurately detected.

Here, a portion of the valve body opposite to the bearing of the valve body means a portion on a side opposite to the side where the bearing is located when the valve body is divided into at least two by the center axis of the valve body as seen from the exit of the water flow.

The water flow detection device of the above-described present invention includes a protruding skirt portion for forming an orifice-shaped flow passage inside the main body by a rotation of the valve body on the primary side surface of the valve body.

A differential pressure which rotates the valve body varies, affected by the amount of fluid flow and the area and shape of the flow passage through which the fluid passes. Therefore, in the present invention, the area through which the fluid passes is reduced by providing a skirt portion for forming an orifice in the flow passage inside the main body on the primary side surface of the valve body, and a small change of water flow is amplified, so that it is possible to increase an opening angle of the valve body.

In the water flow detection device of the above-described present invention, the valve body includes a weight portion for urging the valve body to a closing direction.

The valve body may be temporarily released even when no fire occurs if the secondary side pipe is depressurized by a small water leakage from seams or the like of the secondary side pipe or water vibration occurs in the pipe when a pump is started by activation of another water flow detection device. Even if the valve body is temporarily released when no fire occurs, in the present invention, the valve body can be immediately restored to a valve closed state by the weight portion, so that a sealing performance when the valve body is closed can be secured.

The weight portion of the above-described present invention can be realized by a dome-shaped protruding portion formed on a secondary side surface of the valve body.

The weight portion forms a part of the valve body, so that it is not necessary to prepare a separate member as the weight portion, and an unnecessary increase of the number of components can be avoided.

The weight portion of the above-described present invention can be realized as a skirt portion.

The skirt portion doubles as the weight portion, so that it is not necessary to prepare a separate member as the weight portion, and an unnecessary increase of the number of components can be avoided.

The weight portion of the above-described present invention can be made of metal.

The weight portion is made of metal, so that both rigidity and weight suitable to the weight portion attached to the movable valve body can be obtained, and a sealing property necessary to restore the valve body when no fire occurs to the valve closed state and close the valve body can be secured. Further, various shapes can be easily formed, so that the weight portion can be applied to valve bodies of various structures.

The weight portion of the above-described present invention can be formed as a weight portion in which a surface of a weight main body made of iron is coated with a rust preventive coating layer and an electrodeposition paint layer.

According to the present invention, a weight portion having both rigidity and weight suitable to the weight portion can be realized at low cost, and further, rust can be prevented by the rust preventive coating layer. The rust preventive coating layer can be formed by a paint layer, and more specifically, the rust preventive coating layer can be implemented by an electrodeposition paint layer and a powder paint layer. Thereby, rust can be prevented.

The urging member of the above-described present invention can be any one of a rubber elastic body, a coil spring, a weight, and a magnet.

The urging member is formed by a rubber elastic body, a spring-type elastic member, a weight, or a magnet, so that the urging member can be realized by a simple configuration.

The urging member of the above-described present invention includes an urging force adjusting unit for urging the detection rod in the opening direction of the valve body.

The urging force for urging the detection rod in the opening direction of the valve body can be adjusted by the urging force adjusting unit, so that the urging force to the detection rod can be adjusted according to various use conditions such as relations with a differential pressure and an opening angle for releasing the valve body.

The above-described present invention can be configured to include a rotation restriction portion for restricting a rotation angle of the detection rod to be smaller than a rotation angle of the valve body.

The rotation restriction portion restricts the rotation angle of the detection rod to be smaller than the rotation angle of the valve body, so that the released valve body does not receive the urging force of the detection rod and the valve body is not prevented from rotating.

The above-described present invention can be configured to include the detection rod in a primary chamber and cause a front end of the detection rod to be in contact with the valve body.

The detection rod is moved from the secondary chamber to the primary chamber, so that the reliability of operation of the detection rod can be improved when it is assumed that dust or the like enters the inside of the water flow detection device.

The above-described present invention can be configured to be provided with a lever in which one end is in contact with the detection rod, the other end is in contact with the switch device, and a rotary damper is provided on a rotation shaft located at a center of the lever.

The lever in which one end is in contact with the detection rod, the other end is in contact with the switch device, and a rotary damper is provided on a rotation shaft located at a center of the lever is provided, so that the rotation movement of the detection rod can be slow with respect to the release movement of the valve body. The rotation movement of the detection rod can be slow, so that it is not necessary to take measures, such as coating, to reduce the friction at the end portion of the detection rod which is in contact with the valve body.

Further, the rotation movement of the lever is easy to understand and the operation of the lever can be easily checked. Furthermore, the rotary damper can be compact, and the installation site of a delay mechanism can be small.

The above-described present invention can be configured so that the switch device is disposed outside of the main body, the other end of the detection rod facing the switch device is disposed on the switch device, and the urging member is disposed to urge the other end of the detection rod facing the switch device.

Thereby, the urging member can be disposed outside of the main body, so that maintenance and replacement can be easily performed outside of the main body.

Advantages

According to the water flow detection device of the present invention, it is possible to realize a new actuated valve type water flow detection device which can be applied to a water flow detection device with a relatively large bore diameter of a size of so-called ("size of so-called" is described in detailed rules of test of water flow detection device) 65 A (2-½") to 200 A (8"), which is usually installed in a general building.

BEST MODES FOR CARRYING OUT THE INVENTION

Hereinafter, embodiments of the present invention will be described with reference to FIGS. 1 to 19.

Figure 1:
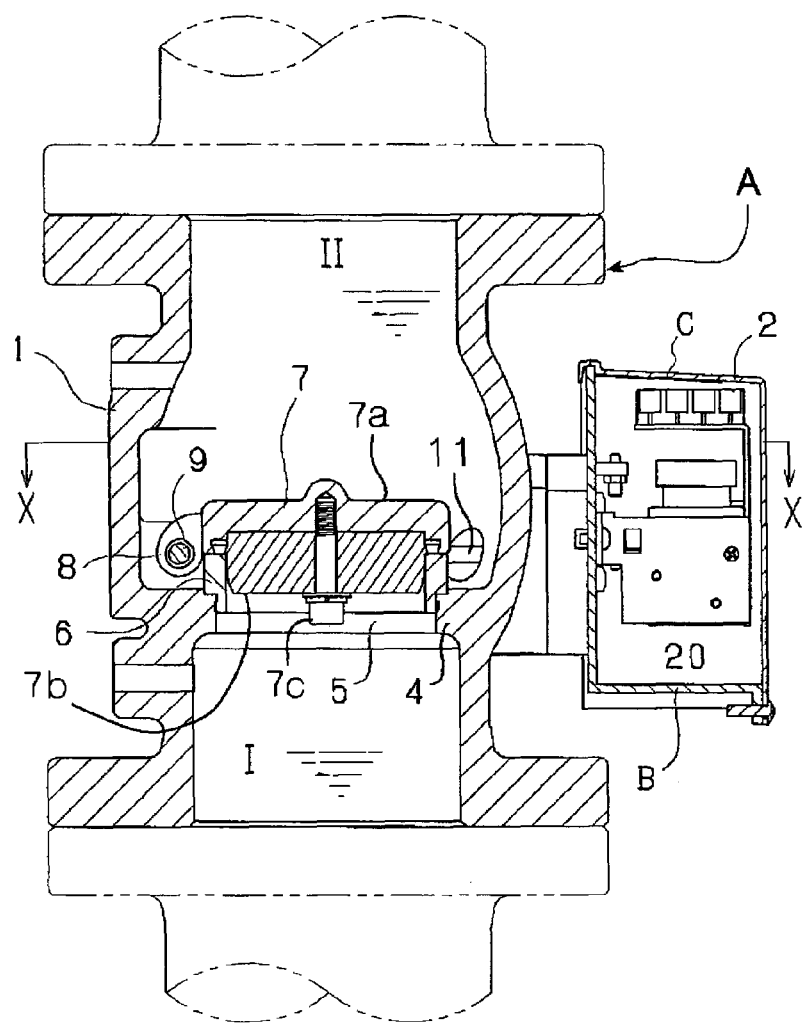
FIG. 1 is a cross-sectional view of a water flow detection device according to an embodiment of the present invention.
Figure 2:
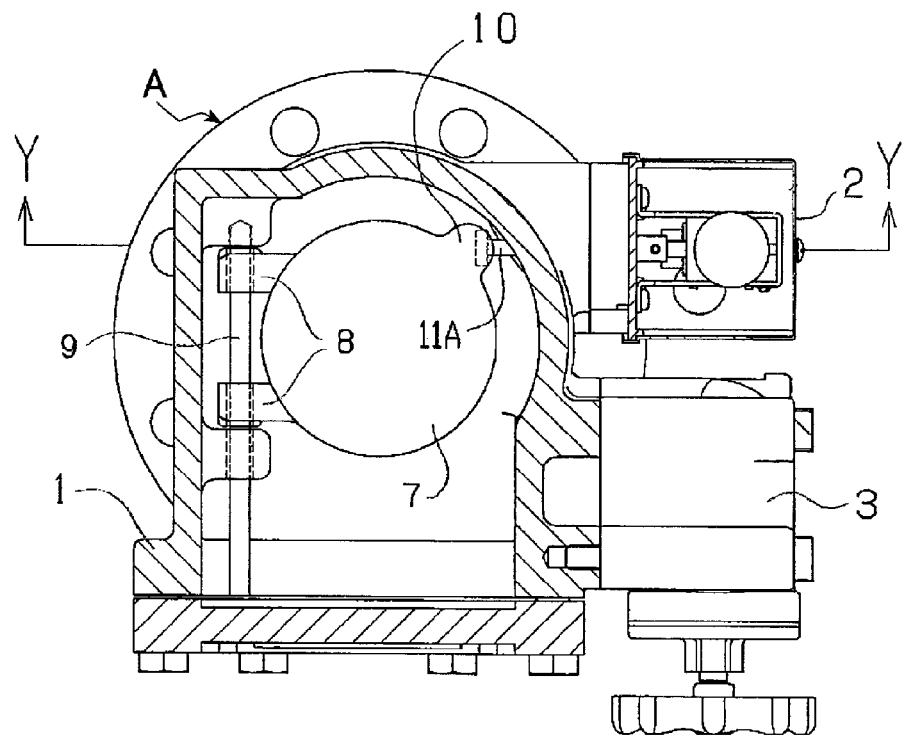
FIG. 2 is a cross-sectional view of FIG. 1 taken along line X-X.
Figure 3:
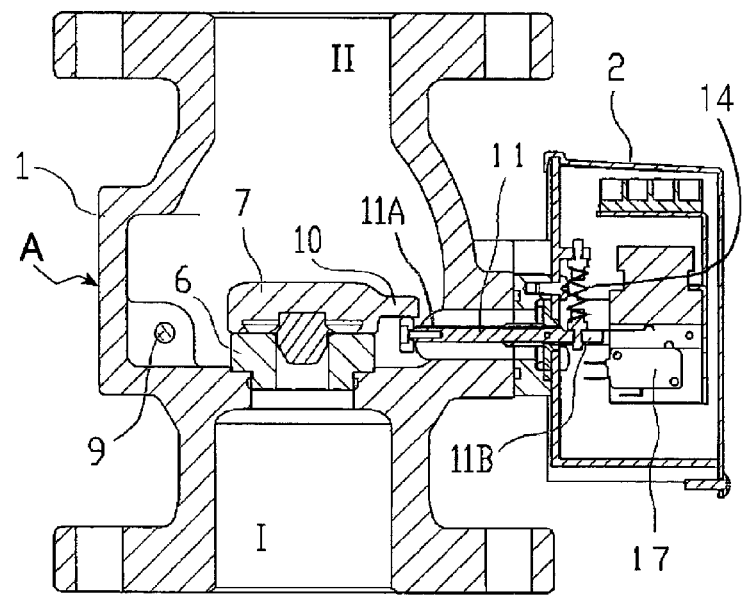
FIG. 3 is a cross-sectional view of FIG. 2 taken along line Y-Y.

A water flow detection device A of the present invention shown in FIGS. 1 to 3 includes a main body 1, a housing 2, and a drain valve 3.

The main body 1 has a hollow cylindrical shape and the inside thereof is divided into a primary chamber I and a secondary chamber II by a partition wall 4. A connection hole 5 is formed in the partition wall 4 and a ring-shaped valve seat 6 is placed on the partition wall 4 on the side of the secondary chamber II.

A disk-shaped valve body 7 is seated on the valve seat 6. Cylindrical-shaped bearings 8 are formed on a part of the circumference of the valve body 7. A valve rod 9 is inserted into the bearing 8.

The valve rod 9 is horizontally suspended inside the main body 1 and supported by the main body 1. The valve body 7 has a check valve structure rotatable toward the secondary chamber II around the valve rod 9 as an axis. When the valve body 7 rotates toward the secondary chamber II and separates from the valve seat 6, a fluid in the primary chamber I can pass through the ring-shaped valve seat 6 to the secondary chamber II.

The valve body 7 includes a valve main body 7a, a convex portion 7b accommodated in a concave portion located on the primary side of the valve main body 7a, and a fastening member including a bolt and a nut to fasten the convex portion 7b to the valve main body 7a. The valve main body 7a is made of metal, more specifically, iron. An electrodeposition paint layer is formed on the entire surface of the valve main body 7a as a rust preventive coating layer (not shown in the drawings). In the same manner, the convex portion 7b is made of iron with an electrodeposition paint layer formed thereon. Although, here, the valve body 7 is obtained by combining the valve main body 7a and the convex portion 7b as separate components, the valve main body 7 may be one component in which the valve main body 7a and the convex portion 7b are integrated together. The convex portion 7b is put inside the valve seat 6 and accommodated in the valve seat 6 in a state in which the valve body 7 seats on the valve seats 6. The convex portion 7b of the present embodiment functions as a protruding skirt portion for forming an orifice inside the main body 1 of the water flow detection device A. The convex portion 7b also functions as a weight portion to secure sealing property of a valve closed state by immediately restoring the valve closed state if the valve body 7 is temporarily opened when no fire occurs.

A protrusion portion 10 formed to be protruded from the circumference of the valve body 7 is provided (FIGS. 2 and 3).

More specifically, the protrusion portion 10 is provided on the circumference of the valve body 7 on the opposite side from the side where the bearings 8 are provided in the valve body 7 as seen from the exit of the water flow, in other words, on the opposite side from the side where the valve body 7 is in contact with the valve rod 9. An end portion 11A of a detection rod 11 is in contact with a surface of the protrusion portion 10 on the side of the valve seat 6. The detection rod 11 is pivotally supported by a pin P at a middle position thereof (FIG. 4), and can rotate vertically in FIG. 4. When the end portion 11A of the detection rod 11 is in contact with the valve body 7, the detection rod 11 is substantially horizontal. The detection rod 11 is in contact with the valve body 7 and functions as a detection rod for turning on the switch device (limit switch 17 described later) when the valve body 7 rotates in an opening direction.

The protrusion portion 10 is formed at a position deviated away from the center axis of the valve body 7. This is because, when the lower portion of FIG. 2 is assumed to be the front, the detection rod 11 protruded from the main body 1 is disposed at a rear side-surface and the drain valve 3 is disposed on a front side-surface. The detection rod 11 is disposed at the rear side-surface, so that the width of the water flow detection device A is shortened and the water flow detection device A is downsized compared with a case in which the housing 2 accommodating the detection rod 11, the limit switch 17, and the like is located on the center of the side surface. The drain valve 3 is disposed on the front side-surface, more specifically, the drain valve 3 is disposed along with the housing 2 on the same side surface, the water flow detection device A is downsized compared with a case in which the drain valve 3 is disposed on another side surface. If the protrusion portion 10 is provided on the circumference of the valve body 7 at a position farthest from the rotation axis (bearing 8 and valve rod 9) of the valve body 7, the amount of rotation of the detection rod 11 is substantially the same as that of the valve body 7. In this case, the amount of rotation of the detection rod 11 is too large with respect to a small amount of operation to turn on/off the limit switch 17 described later, so that it is extremely difficult to properly link the rotation of the detection rod 11 to the turning on/off of the limit switch 17. To solve the above problem, in the present embodiment, the protrusion portion 10 is provided on the circumference of the valve body 7 at a position nearer to the rotation axis of the valve body 7 than the position farthest from the rotation axis. Thereby, the amount of rotation of the detection rod 11 is smaller than that of the valve body 7, so that the amount of rotation of the detection rod 11 can be applied to the small amount of operation to turn on/off the limit switch 17.

A flange portion F is formed at a front end of the end portion 11A of the detection rod 11 and the edge of the flange portion F has a rounded shape. When the valve body 7 performs an opening operation, the detection rod 11 rotates along with the opening operation, and the flange portion F moves sliding on the surface of the protrusion portion 10 until the detection rod 11 is detached from the protrusion portion 10 of the valve body 7, so that the rounded shape of the edge of the flange portion F has an effect to smoothly slide the detection rod 11 with respect to the protrusion portion 10. The flange portion F may have a spherical shape instead of a disk shape.

Figure 4:
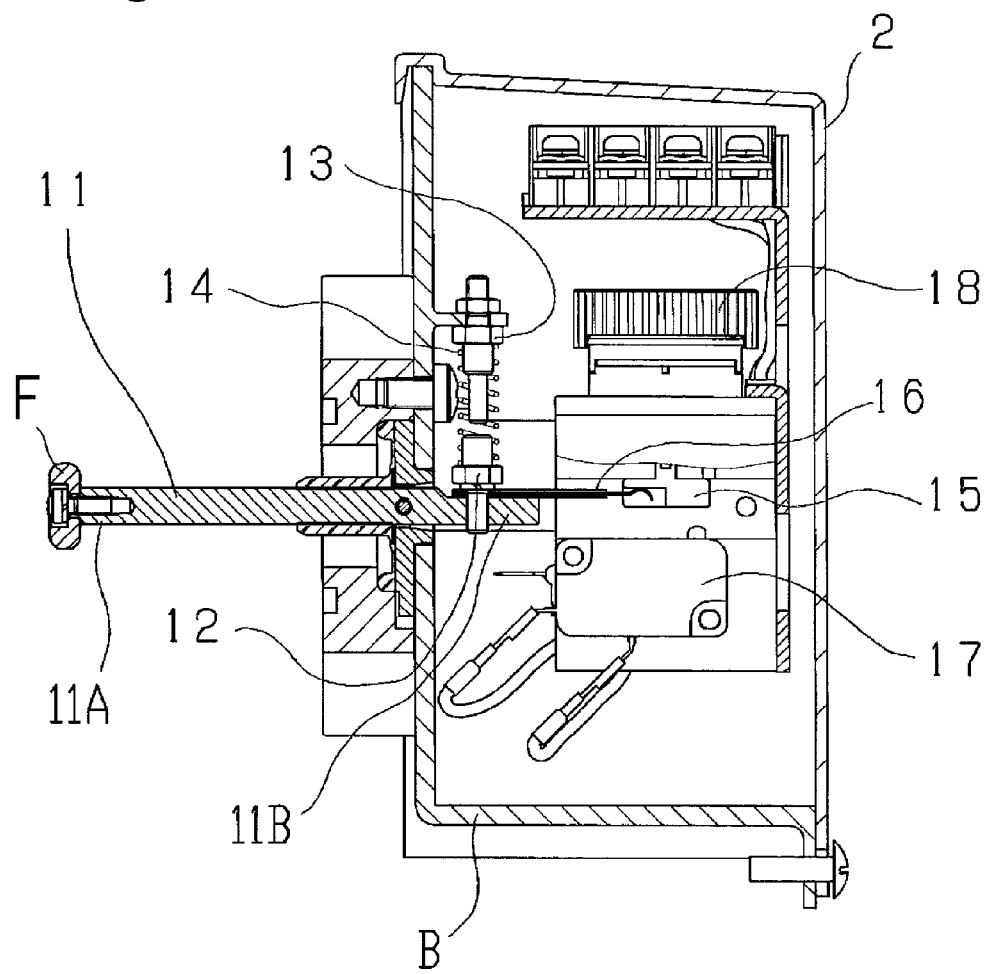
FIG. 4 is an enlarged cross-sectional view of a housing portion in FIG. 3.
Figure 5:
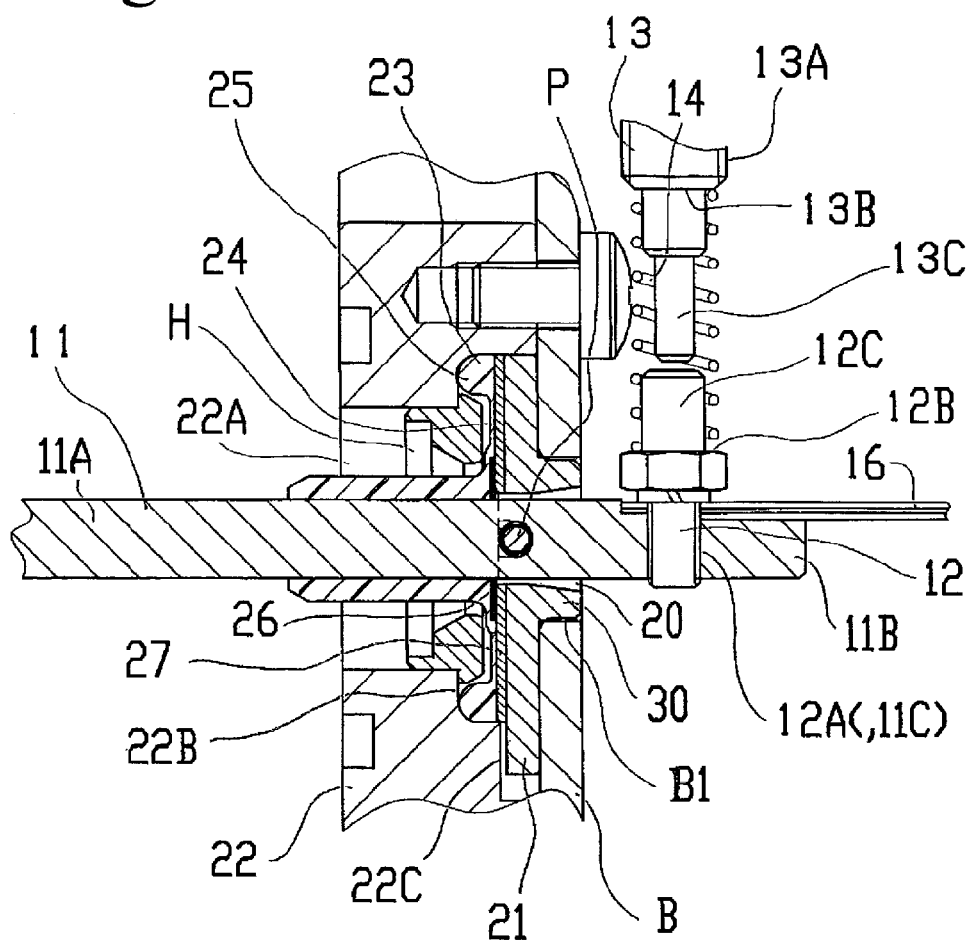
FIG. 5 is an enlarged cross-sectional view of a retainer and peripheral portions thereof in FIG. 4.
Figure 6:
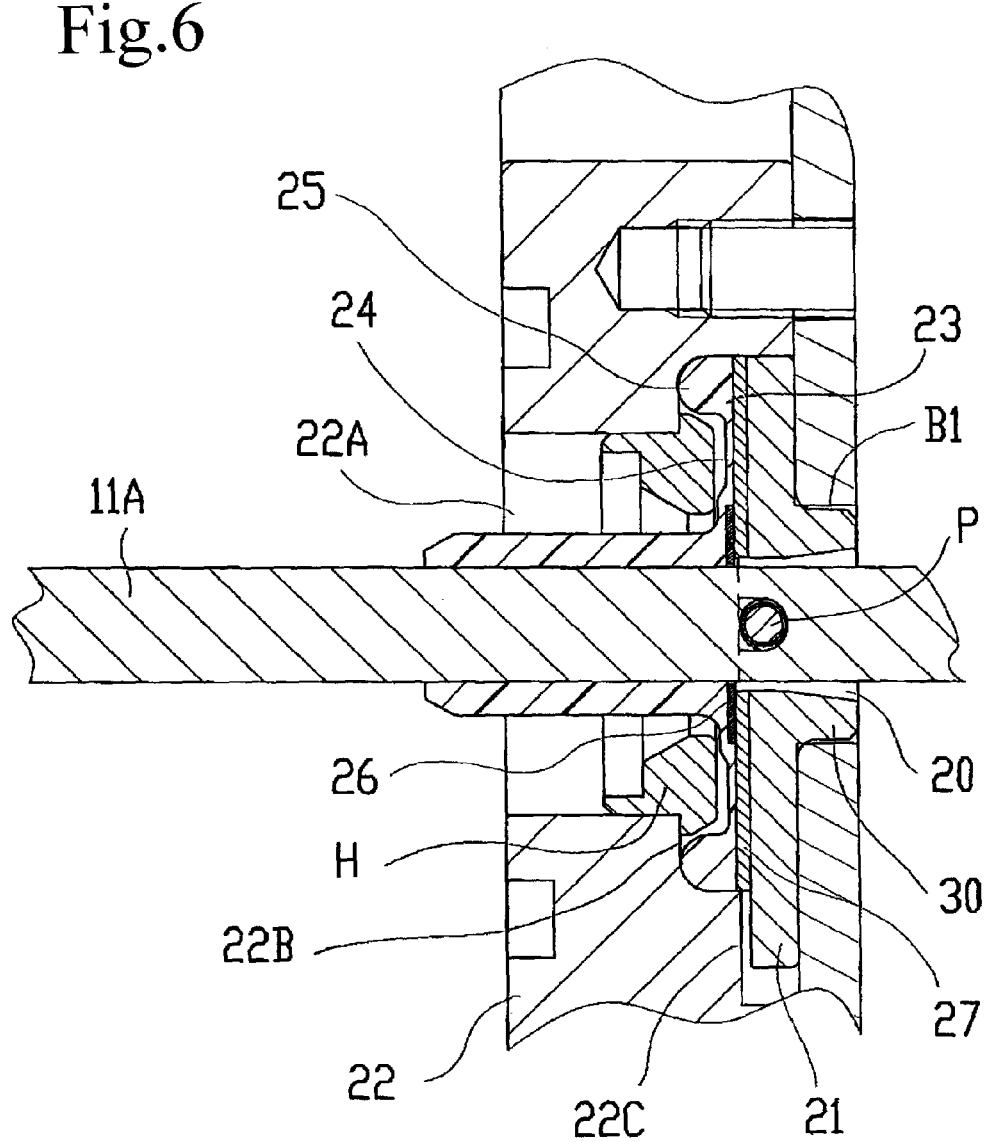
FIG. 6 is an enlarged cross-sectional view of a seal member and peripheral portions thereof in FIG. 5.

An end portion 11B of the detection rod 11 opposite to the end portion in contact with the valve body 7 protrudes to the outside of the main body 1 and is covered by the housing 2. As shown in FIGS. 4 and 5, a column-shaped spring seat 12 protruding upward in the drawings is disposed on the end portion 11B, and a spring seat 13 disposed on a base B is provided above the spring seat 12 in the drawings. A coil spring 14 is provided between both spring seats 12 and 13 as an elastic body. The coil spring 14 functions as an urging member for urging the detection rod 11 in an opening direction of the valve body 7.

The spring seat 12 has a column shape and a male screw 12A is formed at one end thereof. The male screw 12A is fastened with a female screw 110 provided in the end portion 11B of the detection rod 11. The male screw 12A and the female screw 110 are arranged in a direction perpendicular to the pin P. A step portion 12B on which an end portion of the coil spring 14 seats is formed in a middle portion of the spring seat 12 and a column portion 12C which is inserted into the inside of the coil spring 14 is formed from the step portion 12B. Similar to the spring seat 12, a male screw 13A, a step portion 13B, a column portion 13C are formed on the spring seat 13.

The coil spring 14 is held between the spring seats 12 and 13. The distance between the spring seats 12 and 13 can be changed by changing a screwing length of the spring seat 12 into the detection rod 11 and a screwing length of the spring seat 13 into the base B of the housing 2. Thereby, the amount of deflection of the coil spring 14 can be changed, so that an elastic force urging the detection rod 11 can be adjusted.

Figure 7:
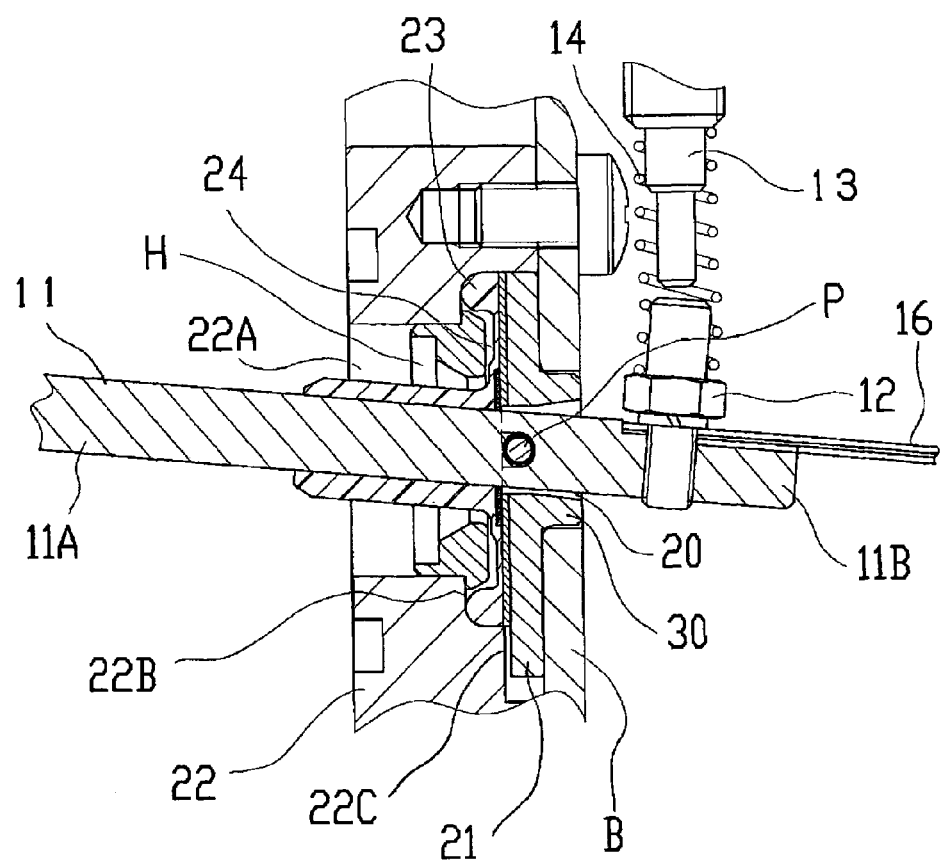
FIG. 7 is an enlarged cross-sectional view showing a state in which a detection rod rotates along with opening of a valve body.
Figure 8:
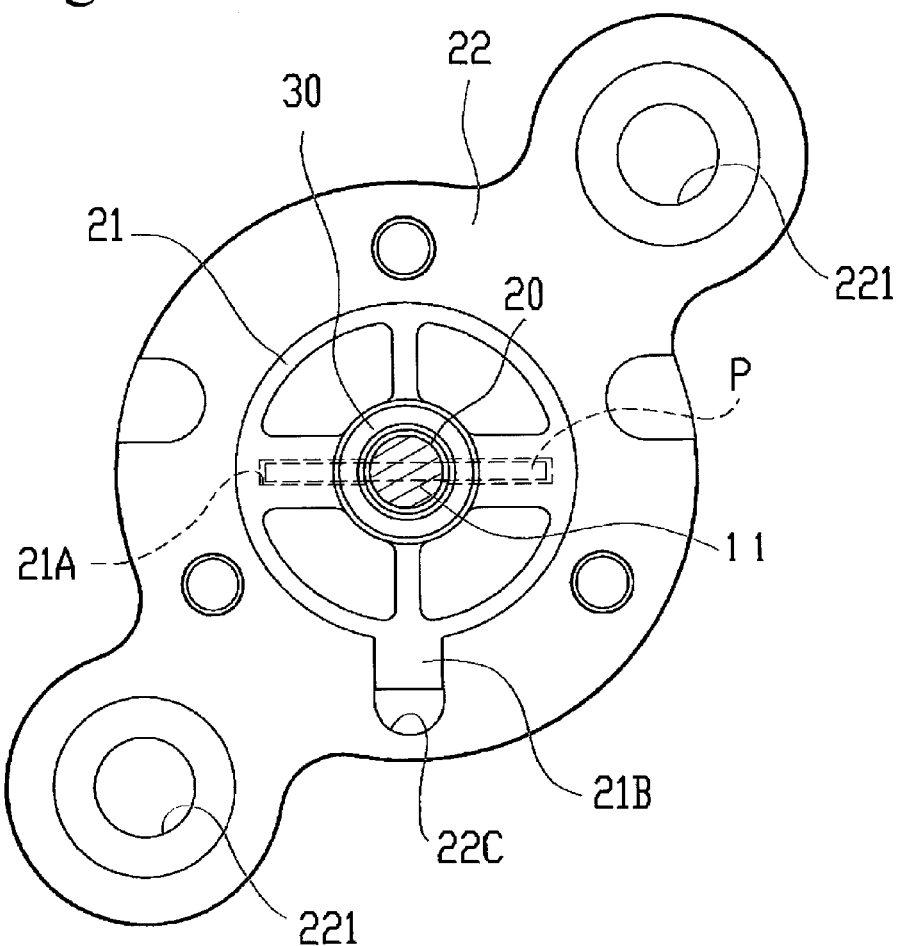
FIG. 8 is a partial assembly diagram of an extended block and the retainer.
Figure 9:
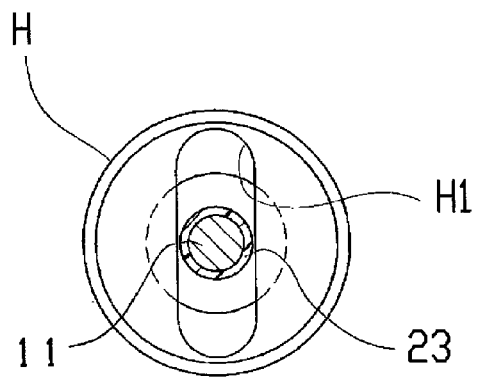
FIG. 9 is an illustration of an embodiment in which a hole shape of a holder is a slotted hole.

When the end portion 11A of the detection rod 11 is in contact with the valve body 7, the front ends of the column portions 12C and 13C are in contact with each other or approach each other with a small gap in-between. When the valve body opens and the end portion 11A of the detection rod 11 is detached from the valve body 7, as shown in FIG. 7, the end portion 11B of the detection rod 11 receives the urging force of the coil spring 14 and rotates below the horizontal position around the pin P as the rotation axis, so that the column portion 12C moves away from the column portion 13C. The reason why the front ends of the column portions 12C and 13C are usually in contact with each other or approach each other is because a limit switch pressing piece 15 and a contact element 16 are not damaged by an abnormal rotation of the end portion 11B of the detection rod 11. Specifically, even when an abnormality occurs in which a foreign object is caught between the end portion 11A of the detection rod 11 and the valve body 7 and the end portion 11A of the detection rod 11 tries to rotate toward the partition wall 4 from the horizontal position, the column portions 12C and 13C interfere with each other, so that it is possible to prevent the detection rod 11 from rotating. In this way, the column portions 12C and 13C function as a reverse rotation preventing unit of the detection rod 11 which rotates around the pin P as a rotation axis.

The coil spring 14 usually urges the end portion 11B of the detection rod 11 downward in FIG. 7. Therefore, the end portion 11A opposite to the end portion 11B is urged upward in FIG. 7 using the pin P as the rotation axis, in other words, the end portion 11A is urged in a direction in which the valve body 7 opens. However, the urging force of the coil spring 14 is too weak to open the valve body 7.

The contact element 16 that is in contact with the limit switch pressing piece 15 is fixed to the end portion 11B of the detection rod 11. The contact element 16 urges the limit switch pressing piece 15 in a direction in which the limit switch pressing piece 15 is moved away from the limit switch 17. The contact element 16 is placed to be sandwiched between the spring seat 12 and the end portion 11B of the detection rod 11.

A delay mechanism 18 is disposed in a direction in which the contact element 16 urges the limit switch pressing piece 15. The delay mechanism 18 has a function for delaying the movement of the limit switch pressing piece 15. A structure using an air damper or an oil damper is used for the delay mechanism 18. The operation of the delay mechanism 18 will be described later.

The pin P pivotally supporting the detection rod 11 shown in FIGS. 4 to 8 is provided to intersect with the center of a hole 20 of a plate-shaped retainer 21 having the hole 20 at the center thereof. A groove-shaped bearing 21A for accommodating the pin P is carved on one surface of the retainer 21. The pin P is configured so as not to go out from the bearing 21A by a washer 27 described later.

The retainer 21 is placed between the base B of the housing 2 and an extended block 22. The extended block 22 is a member for connecting the main body 1 with the housing 2. The extended block 22 can be integrally formed with the main body 1 of the water flow detection device A. When the extended block 22 is integrally formed, the number of components is reduced, so that there is an effect of reducing cost. On the other hand, when the extended block 22 is mounted in the housing 2 as one independent component as in the present embodiment, the housing 2 can be handled as a unit component, so that it is possible to separate the housing 2 from the main body 1 and check or replace the housing 2.

A plurality of bolt through holes 221 for connecting to the main body 1 by a plurality of bolts are formed in the extended block 22. Although not shown in the drawings, female screws are formed in the main body 1 at positions corresponding to the bolt through holes 221.

A hole 22A connected to the secondary chamber II of the main body 1 is formed inside the extended block 22, and the retainer 21 is placed on a step 22B formed in a middle portion of the hole 22A via a seal member 23. The seal member 23 maintains the inside of the main body 1 filled with water in a liquid-tight state with respect to the inside of the housing 2.

A groove 22C, which is a retainer holding means for holding the retainer 21 at a predetermined position, is formed on a surface of the extended block 22 facing the housing 2. When the groove 22C engages with a protrusion 21B formed on the outer circumference of the retainer 21, the retainer 21 is held at a predetermined position on the extended block 22. Thereby, it is possible to prevent the retainer 21 from shifting or rattling, and further, the axis of the pin P placed in the bearing 21A of the retainer 21 is arranged horizontally to be perpendicular to a direction of water flow flowing in the water flow detection device A. Therefore, the end portions 11A and 11B of the detection rod 11 pivotally supported by the pin P can swing in a direction parallel to the direction of the water flow.

As an engagement structure between the retainer 21 and the extended block 22, in addition to the above embodiment, it is possible to form a convex portion on the outer surface of the retainer 21 and form an engaging protrusion corresponding to the convex portion on the extended block 22, or form an outer shape of the retainer 21 into a polygonal shape and form a fitting concave portion having the same polygonal shape on the extended block 22. Or, it is possible to dispose the retainer 21 and the extended block 22 at a predetermined position and fasten them together using a plurality of screws.

The seal member 23 has a cylindrical shape and is formed of an elastic material such as a rubber, so that the seal member 23 can be deformed according to the rotation movement of the detection rod 11. The detection rod 11 is inserted into a cylindrical portion of the seal member 23. When the seal member 23 is formed, the detection rod 11 may be inserted into the seal member 23 to form an integrated body. When knurling patterns are formed on a surface on which the seal member 23 of the detection rod 11 is placed, the seal member 23 is prevented from being disengaged.

A thin flange portion 24 extending in a direction perpendicular to the axis of the cylindrical portion is formed at an end of the seal member 23 facing the retainer 21. A protrusion portion 25 having a cross-sectional convex shape protruding to the extended block 22 is formed on the circumference of the flange portion 24, and the protrusion portion 25 is sandwiched between the retainer 21 and the extended block 22.

Even when a load is applied to the seal member 23 by the rotation of the detection rod 11, the seal member 23 is elastically deformed due to the elasticity of the flange portion 24, so that it is possible to prevent the seal member 23 from being broken. The protrusion portion 25 on the circumference of the flange portion 24 is sandwiched and fixed between the retainer 21 and the extended block 22, so that it is possible to prevent a case in which the seal member 23 is disengaged by the rotation movement of the detection rod 11 and water leaks.

A cylindrical-shaped holder H is provided between the flange portion 24 and the extended block 22. When the water flow detection device A is installed, the secondary pipe is filled with water, and at this time, compressed air remains in the secondary pipe due to air pockets. The compressed air is a cause for reducing the sensitivity of the water flow detection device A to detect the water flow, so that the residual air may be removed by vacuumizing the secondary pipe by a vacuum pump after the water is filled. However, the seal member 23 may be pulled toward the secondary chamber II of the main body 1 and disengaged from the normal mounting position by the vacuumizing of the secondary pipe. If the seal member 23 is disengaged from the normal mounting position, there is a risk that airtightness of the secondary pipe cannot be maintained. The holder H prevents such an unnecessary movement of the seal member 23. Therefore, one end of the holder H is arranged to be in contact with or near the flange portion 24. A step portion is provided on the outer circumference of the holder H and the step portion is engaged with the step portion 22B of the extended block 22, so that unnecessary movements of the holder H itself and the seal member 23 are prevented.

The inner circumference of the holder H has a taper shape widened like a funnel toward the main body 1. The inner circumference of the holder H does not interfere with the rotating detection rod 11. Although the hole shape of the inner circumference of the holder H is formed into a precise circle, for example, it is more preferable to form the hole shape into an elongated hole H1 of an embodiment shown in FIG. 9. The elongated hole H1 has an advantage that the rotating detection rod 11 can be prevented from swinging in a direction perpendicular to the direction of the water flow by forming the elongated hole H1 so that the width thereof is slightly larger than the outer diameter of the detection rod 11. The water flow detection device A controls generation of a signal by the limit switch 17 by the rotation movement of the detection rod 11 linked to the release of the valve body 7. However, if the detection rod 11 rotates while swinging unsteadily in a direction perpendicular to the direction of the water flow, the amount of rotation of the detection rod 11 does not accurately correspond to the amount of rotation of the valve body 7, so that there is a risk that generation of a signal by the limit switch 17 varies. The present embodiment can avoid the risk. By causing the detection rod 11 to come into contact with both ends of the elongated hole H1 in the longitudinal direction, it is possible to control the amount of rotation (rotation angle) when the detection rod 11 rotates in a direction parallel to the direction of the water flow.

Two washers 26 and 27 through which the detection rod 11 passes are attached between the flange portion 24 of the seal member 23 and the retainer 21. The two washers 26 and 27 are mounted in a state in which the surfaces facing each other are in contact with each other. The washers 26 and 27 are interposed, so that, when the detection rod 11 rotates, the surfaces of the washers 26 and 27 in contact with each other slide with respect to each other. Thereby, the rotation movement of the detection rod 11 is smoothed, and a load applied to the flange portion 24 when the detection rod 11 rotates is reduced. The washer 27 in contact with the retainer 21 receives the flange portion 24 of the seal member 23 to which hydraulic pressure is applied on a flat surface without unevenness. If the washer 27 is absent, there is a risk that the flange portion 24 breaks into the bearing 21A of the retainer 21 due to the hydraulic pressure from the main body 1 and the flange portion 24 is broken. However, in the present embodiment, the washer 27 prevents the unevenness of the retainer 21 including the bearing 21A from being exposed to the flange portion 24, so that there is not such a risk. Therefore, the outer diameter of the washer 27 is the same as that of the flange portion 24. On the other hand, the internal diameter of the washer 27 has a value so that there is a clearance gap in which the detection rod 11 can rotate freely.

The internal diameter of the washer 26 in contact with the seal member 23 is similar to the diameter of the detection rod 11, and the outer diameter of the washer 26 is smaller than that of the washer 27. If the washer 26 is absent, there is a risk that the flange portion 24 that receives the hydraulic pressure breaks into a gap between the washer 27 and the detection rod 11 and the flange portion 24 is broken. However, in the present embodiment, the washer 26 having an internal diameter similar to the diameter of the detection rod 11 blocks the gap, so that there is not such a risk.

The surfaces of the washers 26 and 27 are coated with a resin. The resin coating is performed in order to improve lubricity between the washers 26 and 27. The resin coating has an effect that the washers 26 and 27 slide smoothly with respect to each other when the detection rod 11 rotates and the rotation movement of the detection rod 11 is not prevented. Besides the resin coating, a plating process, a painting process, or a coating process, which has an effect to lubricate the sliding motion between the washers 26 and 27, may be performed.

One surface of the flange portion 24 of the seal member 23 and one surface of the retainer 21 are disposed in parallel with each other via the washers 26 and 27, so that when the flange portion 24 receives a pressure of water in the main body 1, the flange portion 24 and the protrusion portion 25 closely attach to the washer 27 and the extended block 22 and a water stop effect is improved.

Further, a step portion 30 is formed on a surface of the retainer 21 facing the base B from the circumference of the hole 20 to the base B. The step portion 30 is inserted into a hole B1 of the base B so that the positional relationship between the step portion 30 and the limit switch 17 and the like placed in the base B is appropriate. On a hole inside the step portion 30, a taper widened toward the end portion 11B of the detection rod 11 is formed, so that the detection rod 11 does not interfere with the inner circumference of the step portion 30 when the detection rod 11 rotates.

The drain valve 3 is a valve for draining the fluid in the main body 1 to the outside when an inspection or a maintenance is performed. The drain valve 3 is disposed adjacent to the housing 2. Inside of the drain valve 3 is an angle valve structure, and a drain outlet is provided facing downward in FIG. 1. A handle for performing an open/close operation of the drain valve 3 is disposed on the front side, and provided at a position where the handle is operated easily.

Next, an operation of the water flow detection device A according to the present embodiment will be described.

The water flow detection device A described above is installed in a pipe in a fire extinguishing system. The primary chamber I is coupled to a pipe connected to a water supply device such as a pump and a water source such as a water tank, which are not shown in the drawings. A sprinkler head not shown in the drawings is provided to an end of a pipe connected to the secondary chamber II.

The inside of the pipe of the fire extinguishing system is filled with water, and the primary chamber I and the secondary chamber II are also filled with water in the main body 1 of the water flow detection device A. Normally, the valve body 7 is seated on the valve seat 6, the convex portion 7b is put into a flow passage inside the valve seat 6 and accommodated in the valve seat 6, and water flow from the primary chamber to the secondary chamber is blocked. The detection rod 11 in contact with the valve body 7 is substantially horizontal.

When a fire breaks out and the sprinkler head provided to the pipe of the secondary chamber is actuated, the water in the pipe connected to the secondary chamber is discharged from the sprinkler head, so that the pressure of the water is gradually reduced. The pressure of the water in the secondary chamber that closes the valve body 7 is reduced, so that the valve body 7 is pushed up and rotates around the valve rod 9.

The valve body 7 is separated from the valve seat 6 and released, so that the water in the primary chamber I is transferred to the secondary chamber II. At the same time, the detection rod 11 in contact with the valve body 7 rotates around the pin P by an urging force of the coil spring 14, and as shown in FIG. 7, the end portion 11B of the detection rod 11 in the housing 2 rotates below the horizontal position.

When the valve body 7 rotates and the water in the primary chamber I is transferred to the secondary chamber II, the convex portion 7b of the valve body 7 gradually gets out of the inside of the valve seat 6, so that an orifice-shaped flow passage is formed between the outer circumference of the convex portion 7b and the inner circumference of the valve seat 6 and the valve body 7 is pushed up by the flowing water passing through the flow passage. As a result, the valve body 7 is largely rotated by a small amount of flowing water.

Figure 10:
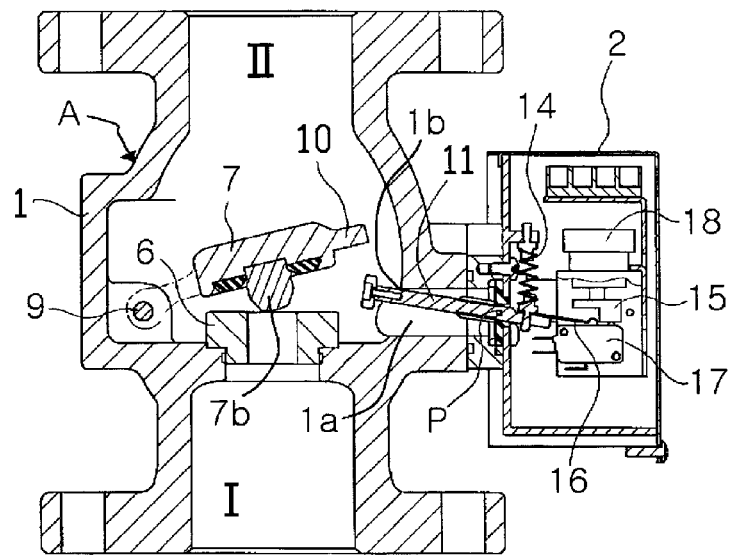
FIG. 10 is a cross-sectional view showing an open state of the valve body.

When the valve body 7 continuously rotates, as shown in FIG. 10, the valve body 7 is released. At this time, the detection rod 11 comes into contact with an opening end portion (rotation restriction portion) 1b of an insertion hole 1a of the detection rod 11, which opens in the secondary chamber II of the main body 1, and the rotation over the rotation restriction portion 1b is restricted. Thereby, the flange portion F of the detection rod 11 is separated from the protrusion portion 10 of the valve body 7, it is possible for the released valve body 7 not to receive the urging force from the detection rod 11.

Thereby, the contact element 16 at the end portion 11B of the detection rod 11 is separated from the limit switch pressing piece 15, and the limit switch pressing piece 15 starts moving toward the limit switch 17. The limit switch pressing piece 15 reaches the limit switch 17 after a predetermined time period elapses by the delay mechanism 18 and actuates the limit switch 17. A signal of the limit switch 17 is transmitted to a monitoring device installed in a building manager room via an electrical lead connected to a terminal block in the housing 2.

The pump described above is started by the signal from the limit switch 17, and water is transferred from a water source to the sprinkler head actuated by a fire. The sprinkler head continuously sprays water and extinguishes the fire.

Next, functions and effects of the water flow detection device A of the present embodiment will be described, except for those that have been already described.

The water flow detection device A includes the coil spring 14 as an urging member for urging the detection rod 11 in an opening direction of the valve body 7. Therefore, while detecting the water flow by linking the rotation of the detection rod 11 to the rotation of the valve body 7 when the valve body 7 opens or closes by the differential pressure, the detection rod 11 does not apply a closing load to the valve body 7. Therefore, even when the rotation of the valve body is small because the water flow in the secondary side is small in a conventional actuated valve type water flow detection device, it is possible to increase an opening angle of the valve body 7. Thus, it is possible to realize an actuated valve type water flow detection device A which reliably detects actuation and can be applied to a water flow detection device with a relatively large bore diameter of 65 A (2-½") to 200 A (8"), which is usually installed in a general building. The water flow detection device A can be applied not only to a water flow detection device with a relatively large bore diameter, but also to a water flow detection device with a relatively small bore diameter which is actually used in a condominium and the like.

The water flow detection device A includes a retainer 21 and an extended block 22 which holds the retainer 21 and is attached to the main body 1 with bolts as a holding member for holding the pin P of the detection rod 11 so that the pin P is in parallel with the valve rod 9 of the valve body 7. The protrusion portion 21B and the groove 22C are provided to the retainer 21 and the extended block 22 as the rotation restriction portion. The protrusion portion 21B and the groove 22C are concave-convex engaged with each other. Therefore, the pin P which is the rotation axis of the detection rod 11 can be always disposed in parallel with the valve rod 9 which is the valve stem of the valve body 7. Thus, the detection rod 11 is not in oblique contact with the valve body 7, so that the amount of displacement of the detection rod 11 is always constant when the detection rod 11 rotates. Thus, by the rotation displacement of the detection rod 11, it is possible to correctly detect that a water flow occurs inside a pipe and the valve body 7 is released, so that the water flow detection device A which reliably detects water flow can be realized.

Next, other embodiments of the water flow detection device A according to the present embodiment will be described, except for the embodiment that has been already described.

Figure 11:
FIG. 11 is an illustration showing another embodiment of the retainer.
Figure 11:
Figure 11:
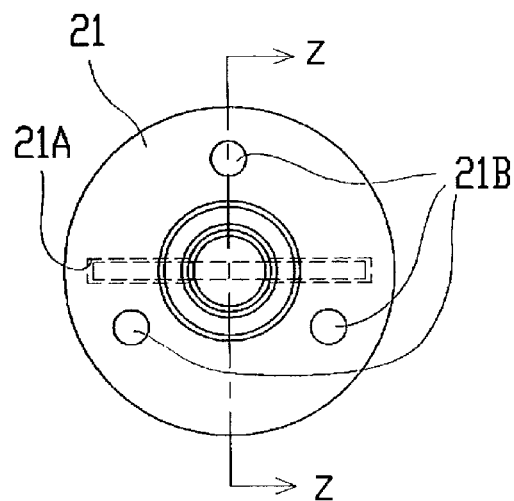
Figure 11:
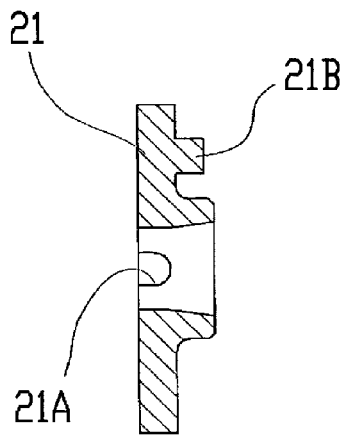

In the embodiment described above, an example is described in which rotation of the retainer 21 is prevented by the engagement structure between the protrusion 21B of the retainer 21 and the groove 22C of the extended block 22 and the pin P that pivotally supports the detection rod 11 is disposed in parallel with the valve rod 9 of the valve body 9. However, for example, as shown in FIG. 11, the protrusion portions 21 b are formed on a surface of the retainer 21 facing the base B of the housing 2, holes (not shown in FIG. 11) corresponding to the protrusion portions 21 b are formed on the base B, and rotation of the retainer 21 and the pin P may be prevented by the engagement structure of the rotation prevention portions.

Figure 12:
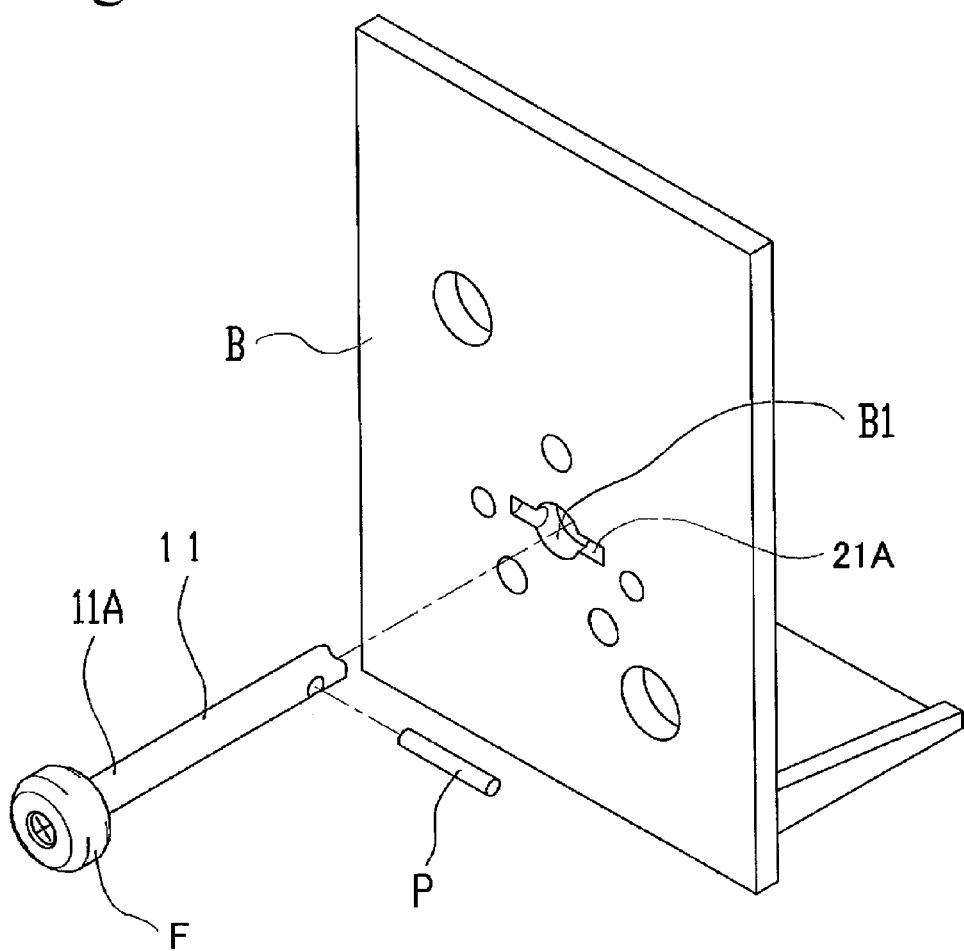
FIG. 12 is an illustration showing an embodiment of a housing that holds a pin.

In the embodiment described above, an example is described in which the pin P that pivotally supports the detection rod 11 is held by the bearing 21 formed in the retainer 21. However, for example, as shown in FIG. 12, a concave portion functioning as a bearing for holding the pin P is formed on the base B of the housing 2, so that it is possible to eliminate the use of the retainer 21.

In the embodiment described above, an example is described in which two washers 26 and 27 are attached between the flange portion 24 of the seal member 23 and the retainer 21. However, by using embodiments as shown in FIGS. 13 and 14, it is possible to eliminate the use of the washers 26 and 27.

Figure 13:
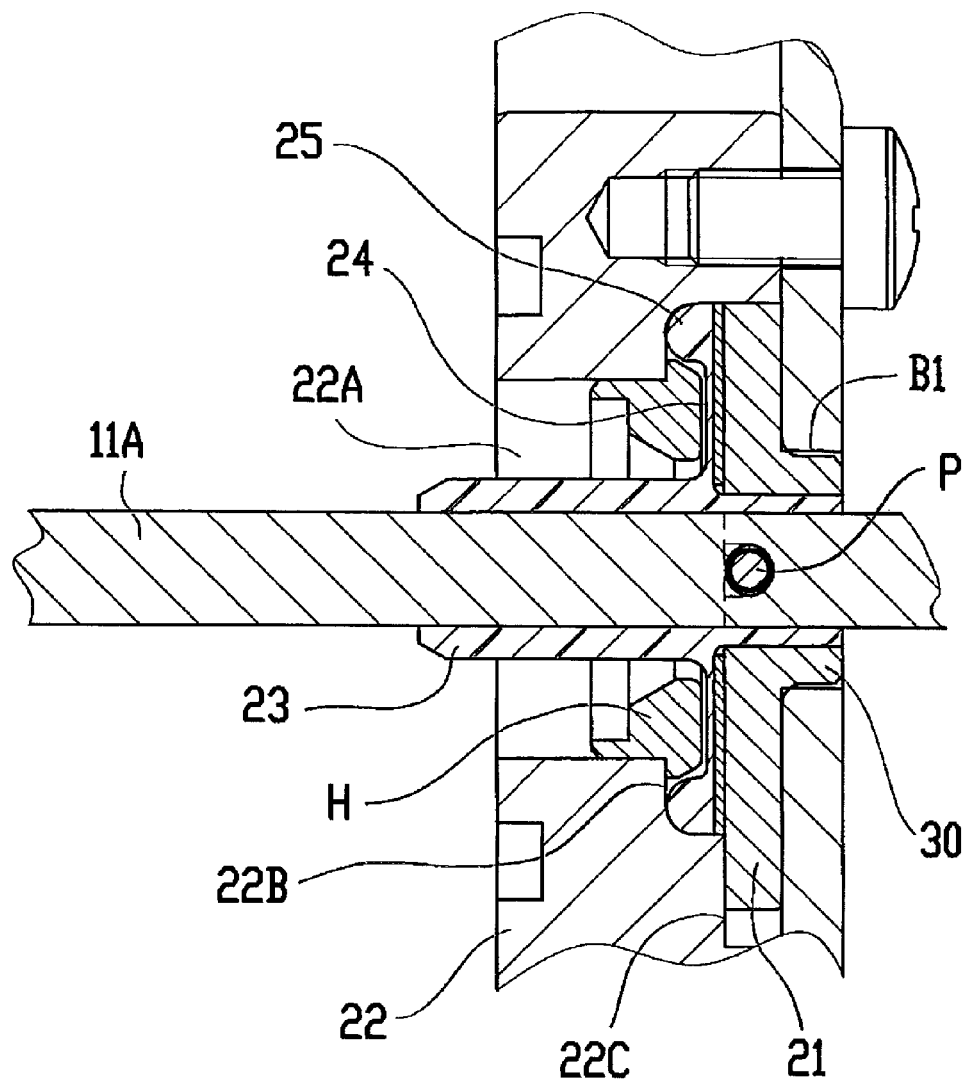
FIG. 13 is an enlarged cross-sectional view showing another embodiment of the seal member and a washer.

Specifically, in another embodiment shown in FIG. 13, a cylindrical protrusion portion that seals the hole 20 of the retainer 21 is formed on the seal member 23 formed of a rubber elastic body such as a silicone rubber, and the use of the washer 26 is eliminated. In the embodiment described above, a gap is set between the washer 27 and the detection rod 11 so as not to interfere with the rotation displacement of the detection rod 11, and the washer 26 is used so that the seal member 23 does not break into the gap. However, in this embodiment, the use of the washer 26 is eliminated by employing a configuration in which the rotation displacement of the detection rod 11 is allowed by an elastic deformation of the seal member 23 instead of the configuration in which the rotation displacement of the detection rod 11 is allowed by the gap. A through hole through which the pin P passes is formed in the protrusion portion provided on the seal member 23 of this embodiment in a direction perpendicular to the cylinder axis of the protrusion portion (not shown in FIG. 13).

Figure 14:
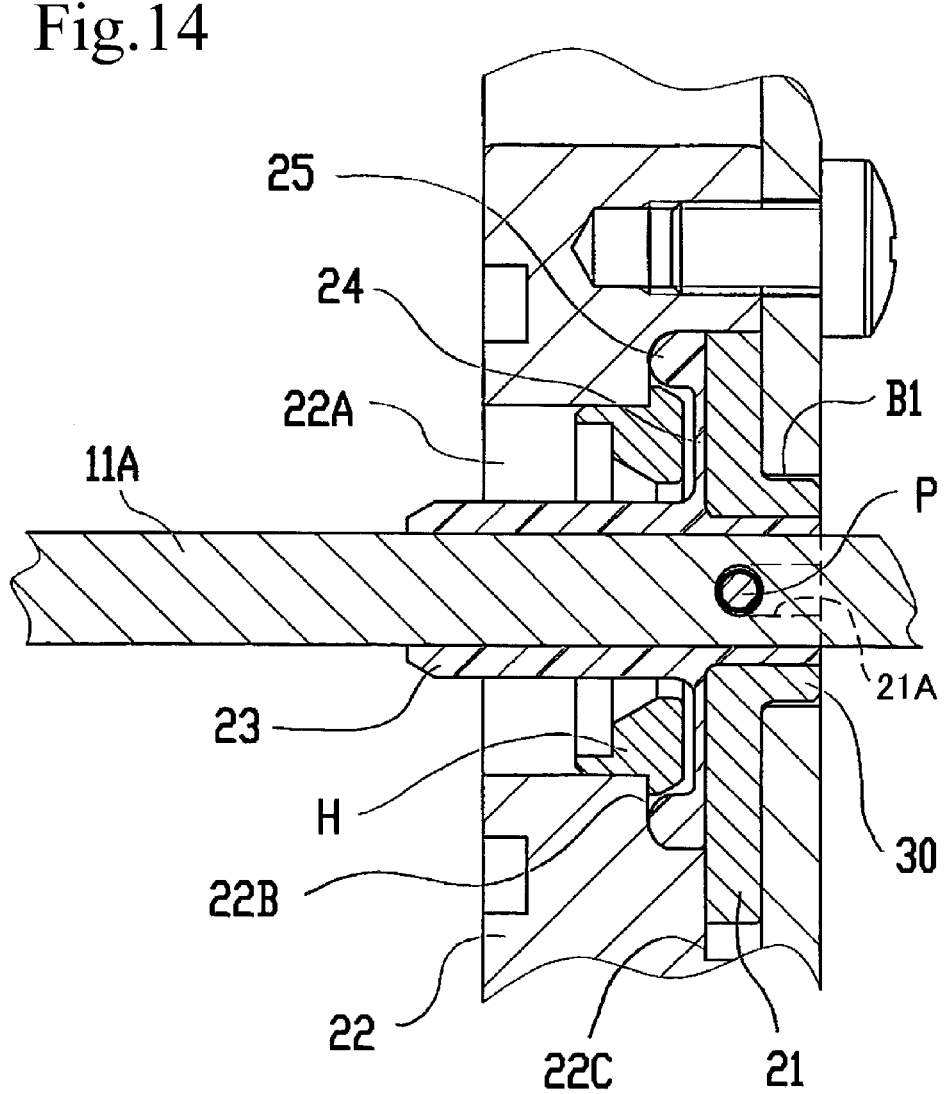
FIG. 14 is an enlarged cross-sectional view showing another embodiment of the seal member.

In another embodiment shown in FIG. 14, the number of components is reduced by eliminating the use of the washers 26 and 27 themselves. Specifically, in this embodiment, a groove-shaped bearing 21A for holding the pin from the side of the base B of the housing 2 is formed in the retainer 21. In the above-described embodiment which uses the washer 27, the washer 27 is used as a lid of the bearing 21A so that the flange portion 24 of the seal member 23 does not break into the groove-shaped bearing 21A formed in the retainer 21 due to the hydraulic pressure from the main body 1 and the flange portion 24 is not broken. However, in the embodiment shown in FIG. 14, the bearing 21A does not face the flange portion 24 of the seal member 23, but the bearing 21A is formed as a groove opening to the side of the base B, so that such a problem can be avoided. The use of the washer 27 is eliminated, and further, the use of the washer 26 is also eliminated by forming a cylindrical protrusion portion similar to that shown in FIG. 11 on the seal member 23. The use of the washers 26 and 27 can be also eliminated by providing a hole penetrating in a direction perpendicular to the cylinder axis of the retainer 21 instead of the groove-shaped bearing 21A opening to the side of the base B as shown in FIG. 12. A through hole through which the pin P passes is formed in the protrusion portion provided on the seal member 23 shown in FIG. 14 in a direction perpendicular to the cylinder axis of the protrusion portion (not shown in FIG. 14).

Figure 15:
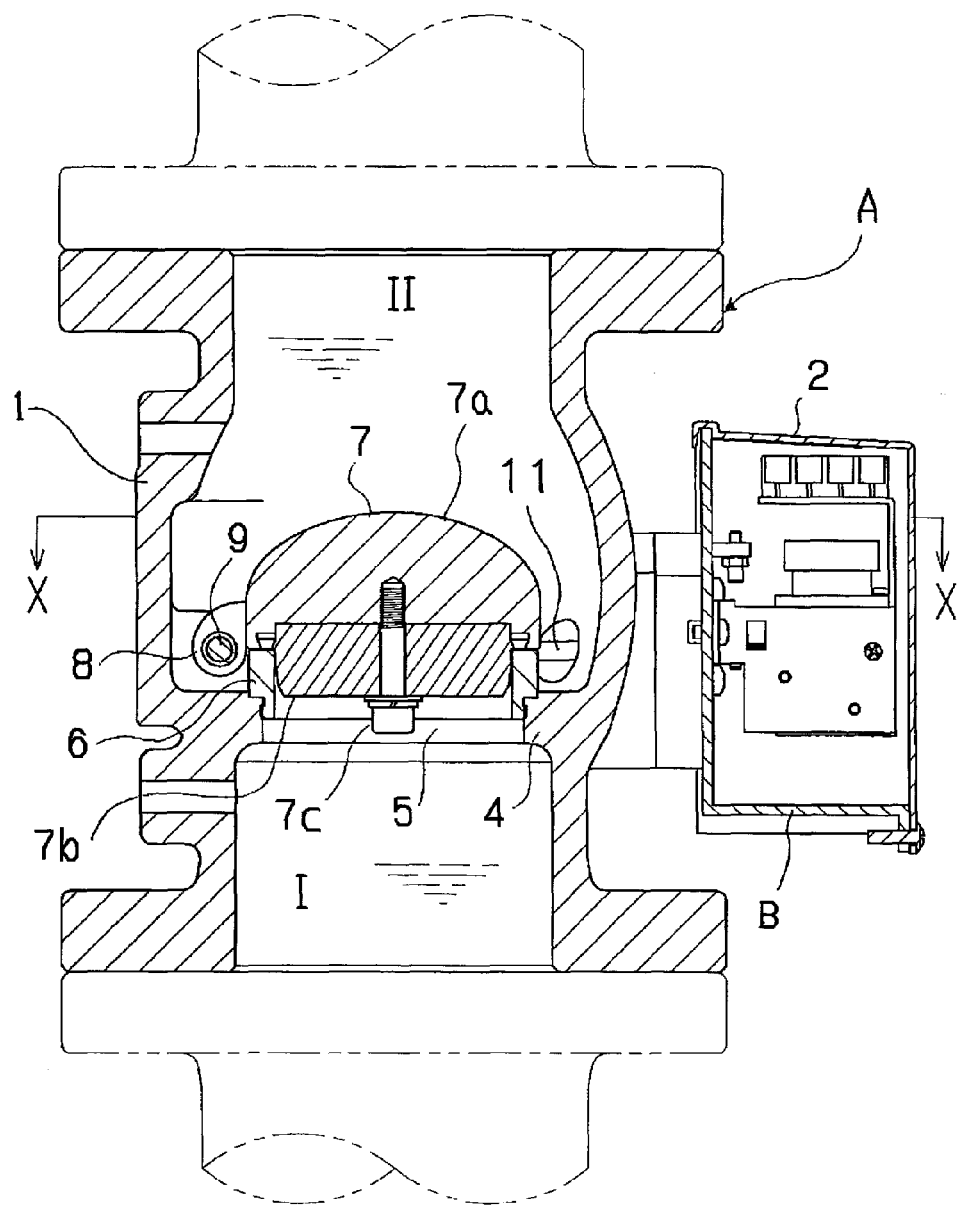
FIG. 15 is a cross-sectional view showing another embodiment of the valve body.
Figure 16:
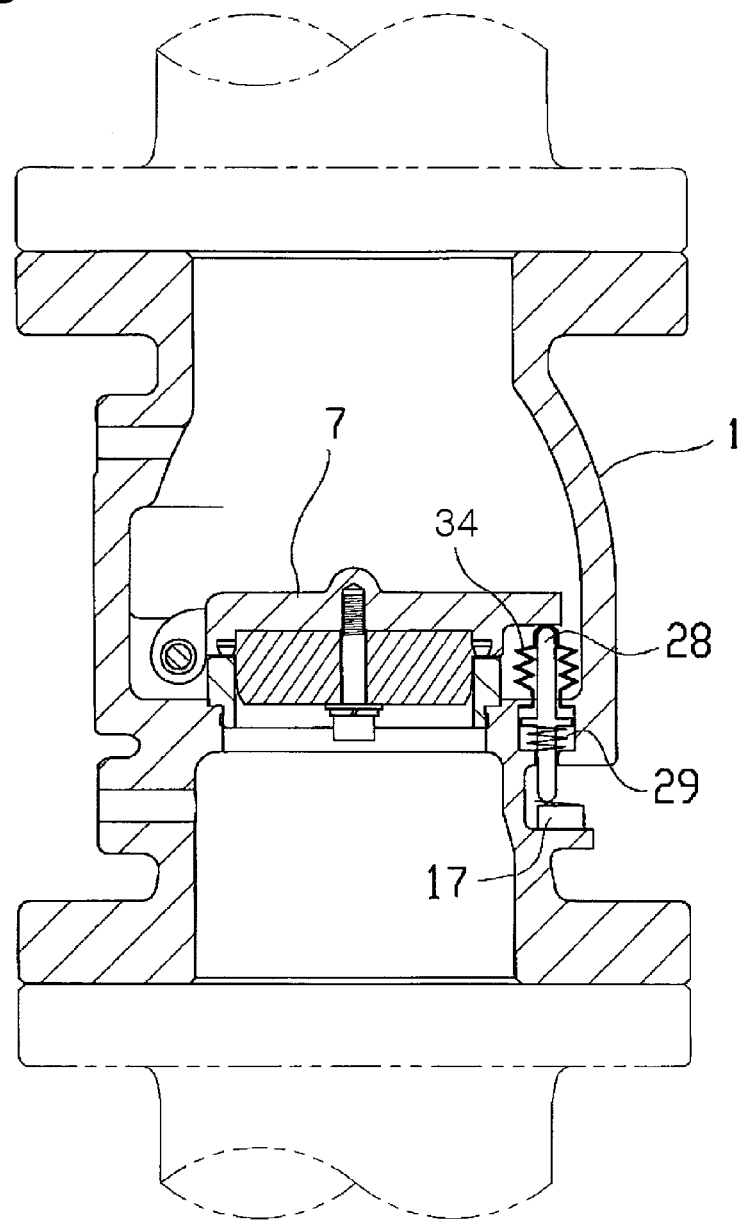
FIG. 16 is a cross-sectional view showing another embodiment of the water flow detection device.

In the embodiment described above, an example is described in which the convex portion 7b of the valve body 7 is used as a weight portion. However, for example, as shown in FIG. 15, the valve main body 7a may be functioned as a weight portion by forming the upper surface of the valve main body 7a into a dome shape.

In the embodiment described above, an example is described in which the detection rod 11 rotates in conjunction with the rotation of the valve body 7. However, the detection rod 11 can be formed as a rod that performs a linear movement as shown in the water flow detection device of FIG. 16. This embodiment includes a detection rod 28 for urging the valve body 7 by a linear movement and a coil spring 29 as an urging member for urging the detection rod 28 upward in FIG. 16. A bellows 34 which maintains the inside of the main body 1 in a liquid-tight state and can expand and contract according to the linear movement of the detection rod 28 is attached to the upper end side of the detection rod 28. The limit switch 17 is provided as a switch device below the lower end of the detection rod 28 outside the main body 1. In this way, it is also possible to implement the water flow detection device.

Figure 17:
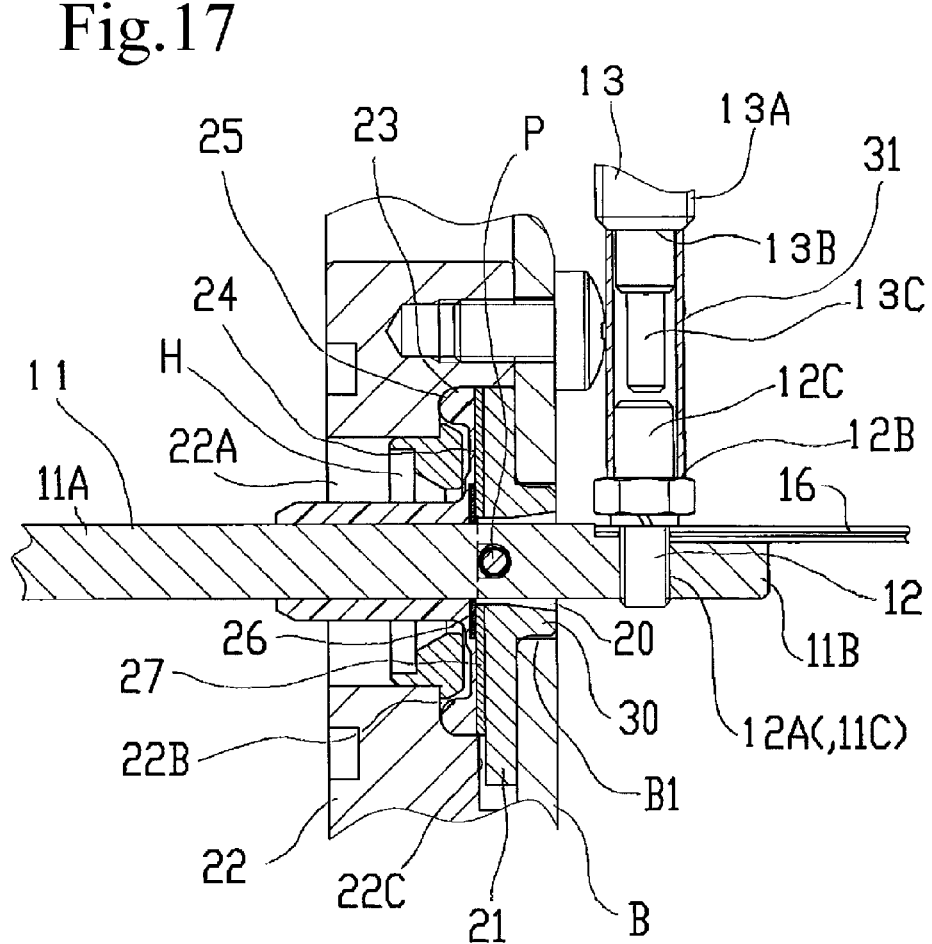
FIG. 17 is a cross-sectional view showing another embodiment of an urging member.

In the embodiment described above, the coil spring 14 is illustrated as an urging member. However, for example, as shown in FIG. 17, a cylindrical elastic body 31 formed of a rubber elastic body such as a silicone rubber is attached between the spring seats 12 and 13 in a compressed state in the same manner as for the coil spring 14, and the elastic force of the elastic body 31 can be used as the urging force.

Figure 18:
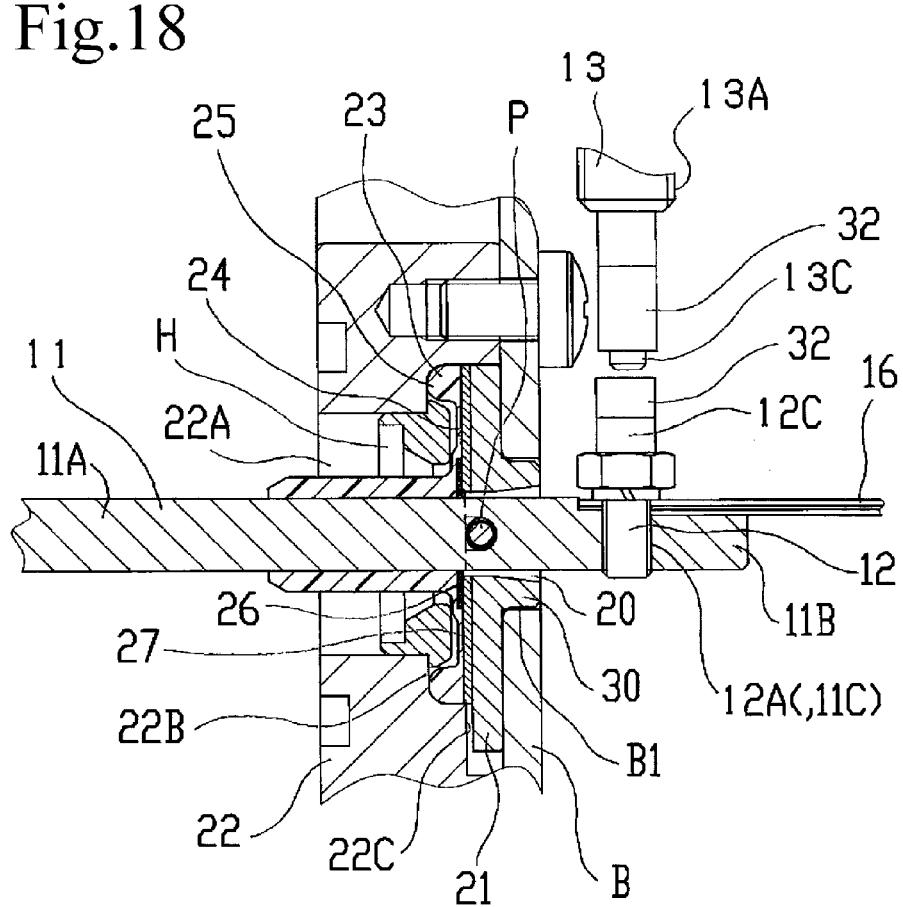
FIG. 18 is a cross-sectional view showing another embodiment of the urging member.

Further, as shown in FIG. 18, magnets 32 facing each other with the same polarity are respectively attached to the spring seats 12 and 13 as urging members, and the repulsive force generated between the two magnets 32 can be used as the urging force. In this case, the magnet 32 attached to the upper end of the column portion 12C also functions as a reverse rotation preventing unit along with the column portion 13C facing the magnet 32.

Figure 19:
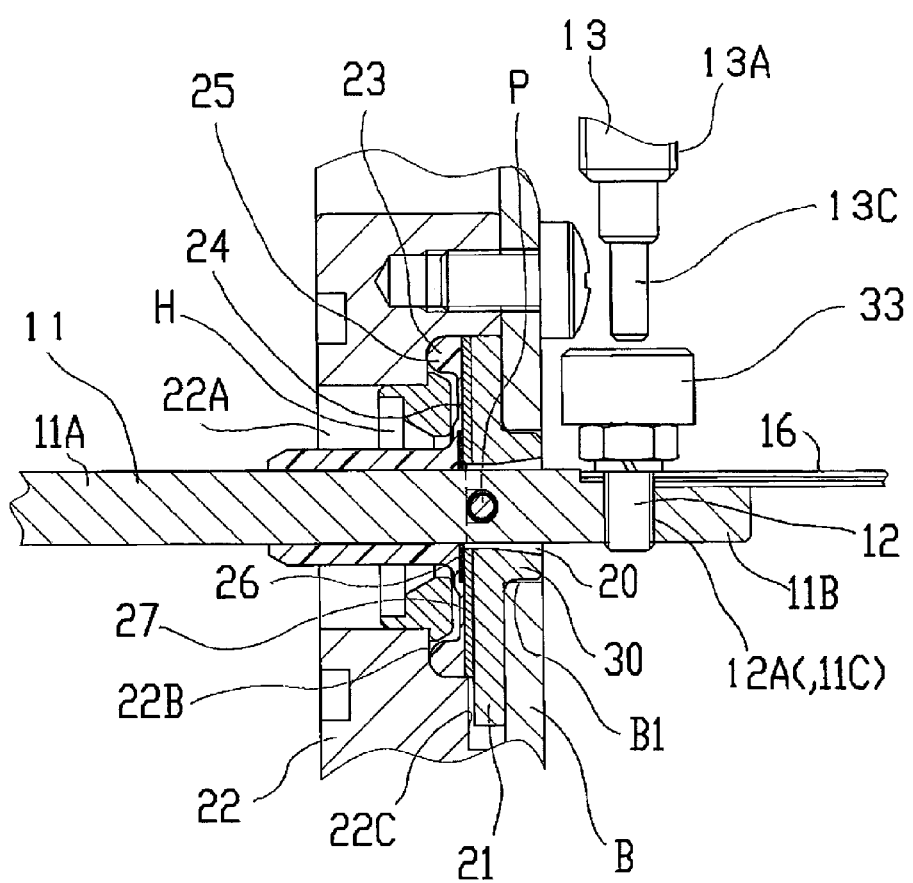
FIG. 19 is a cross-sectional view showing another embodiment of the urging member.

Further, as shown in FIG. 19, a weight 33 is attached to the spring seat 12 as an urging member, and the load of the weight 33 can be used as the urging force. In this case, the weight 32 can be made of metal, and the weight 33 also functions as a reverse rotation preventing unit along with the column portion 13C.

The urging member can be formed by combining any of the coil spring 14, the cylindrical elastic body 31, the magnets 32, and the weight 33.

In the embodiment described above, the protrusion portion 10 is provided on the circumference of the valve body 7 at a position nearer to the rotation axis (bearing 8 and valve rod 9) of the valve body 7 than the position farthest from the rotation axis and the detection rod 11 is in contact with the protrusion portion 10. However, a configuration is also possible in which the protrusion portion 10 is provided on the circumference of the valve body 7 at the position farthest from the rotation axis of the valve body 7 and the detection rod 11 is in contact with the protrusion portion 10.

Figure 20:
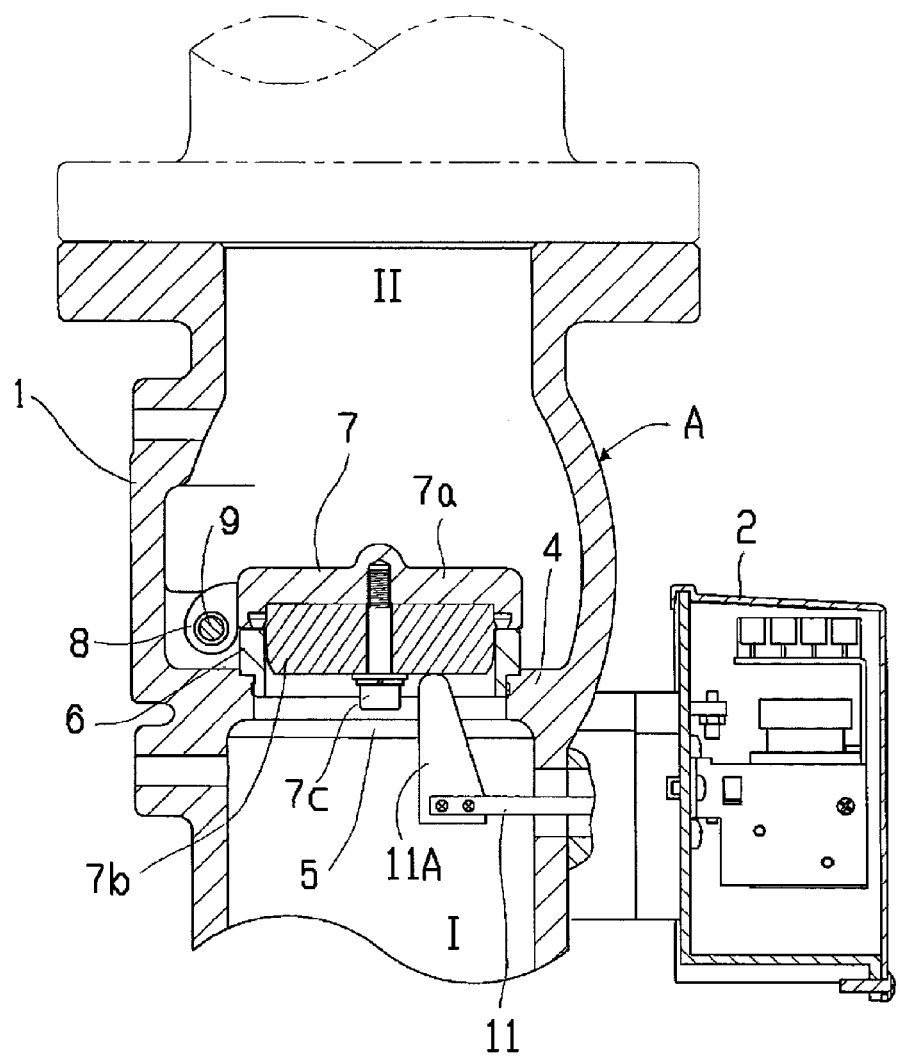
FIG. 20 is a cross-sectional view showing another embodiment in which the detection rod is provided in a primary chamber.

The embodiment described above is an example in which the detection rod 11 is provided in the secondary chamber II of the water flow detection device A. However, FIG. 20 is an example in which the detection rod 11 is provided in the primary chamber I of the water flow detection device A. In this case, in the portions which the detection rod 11 is contact with, the configuration of the limit switch 17, the urging member, and the like covered by the housing 2 can be the same as that of the embodiment described above and the modified examples thereof. However, the end portion of the detection rod 11, which is in contact with the valve body 7, is different. For example, as shown in FIG. 20, the end portion of the detection rod 11, which is in contact with the valve body 7, is a valve body contact portion 11A which is bent at a substantially right angle from a substantially horizontal portion pivotally supported by the pin P. In this way, the detection rod 11 is formed into a substantially L-shape. In the embodiment described above, the detection rod 11 is in contact with the protrusion portion 10 provided on the valve body 7. However, in this example, the detection rod 11 is in contact with the convex portion 7b of the valve body 7. However, this example is the same as the embodiment described above in a point that one end portion 11A of the detection rod 11 is in contact with the valve body 7 at a position opposite to the bearing 8 of the valve body 7.

As shown in FIG. 20, the valve body contact portion 11A of the detection rod 11 can be formed into a paddle shape. Although the valve body contact portion 11A can be formed of a material different from that of the portion pivotally supported by the pin P, the same material can be bent into a substantially L-shape.

When the detection rod 11 is provided in the primary chamber I as in this example, the detection rod 11 is located immediately below the back surface of the valve body 7 and the dust in the flowing water dropped from above is difficult to be accumulated on the detection rod 11 and the area surrounding the detection rod 11, so that the detection rod 11 can be correctly operated over a long period of time.

The location of the delay mechanism 18 can be changed, which actuates the limit switch 17 after a predetermined time period elapses since the rotation of the detection rod 11.

Figure 21:
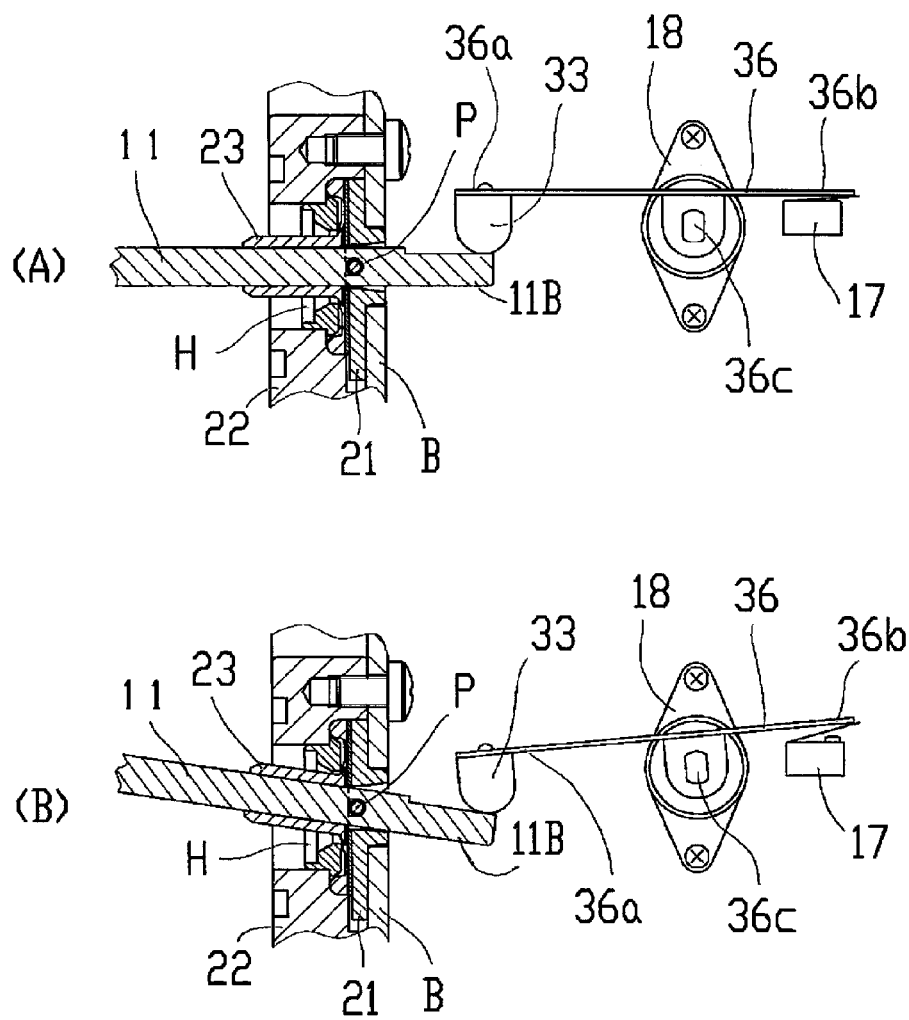
FIG. 21 is a cross-sectional view showing another embodiment in which a rotary damper is used for a delay mechanism.

For example, as shown in FIG. 21, a lever 36, which is in contact with the end portion 11B of the detection rod 11 opposite to the end portion in contact with the valve body 7, is provided. The delay mechanism 18 such as a rotary damper is disposed on a rotation shaft 36c of the lever 36 and the limit switch 17 which can be connected and disconnected is disposed on an end portion 36b of the lever 36.

Figure 22:
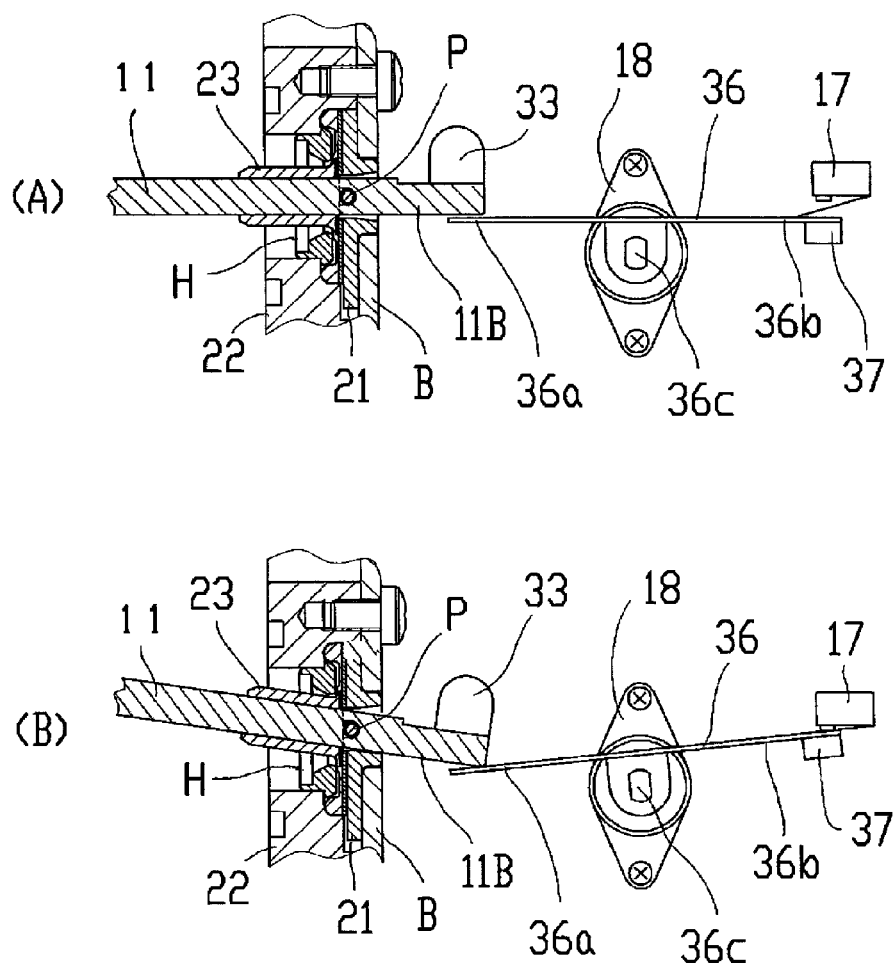
FIG. 22 is a cross-sectional view showing further another embodiment in which a rotary damper is used for the delay mechanism.

As an example in which the delay mechanism 18 is directly provided to the lever 36 in contact with the detection rod 11, there is a configuration shown in FIG. 22 in addition to the configuration shown in FIG. 21.

In FIG. 21, a weight (W) 33 is provided at an end portion 36a of the lever 36 in contact with the detection rod 11, the lower side of the lever 36 is in contact with the detection rod 11 via the weight (W) 33, and the limit switch 17 is disposed on the lower side of the lever 36 at an end portion 36b opposite to the end portion 36a of the lever 36 in contact with the detection rod 11.

On the other hand, in FIG. 22, the lever 36 is in direct contact with the upper side of the detection rod 11 at the end portion 36a of the lever 36 in contact with the detection rod 11, and the limit switch 17 is disposed on the upper side of the lever 36 at the end portion 36b opposite to the end portion 36a of the lever 36 in contact with the detection rod 11. In the example of FIG. 22, the weight (W) 33 is provided on the end portion 11B of the detection rod 11 and the detection rod 11 is urged in a direction to open the valve body 7. Further, an auxiliary weight 37 is provided to urge the lever 36 in the horizontal direction.

Operations of these delay mechanisms 18 will be described.

First, the mechanism shown in FIG. 21 is normally in a state shown in FIG. 21(A). However, when the valve body 7 not shown in FIG. 21 is released, the end portion 11B of the detection rod 11 tries to rotate downward in FIG. 21 by the effect of the weight (W) 33. However, a rotary damper 18 provided on the rotation shaft 36c of the lever 36 applies a damping force to the rotation movement. Thereby, the rotation movement of the lever 36 is separated from the rotation of the detection rod 11 and becomes slow. When the lever 36 starts rotating slowly, the end portion 36b of the lever 36 is separated from the limit switch 17, an actuated state of the limit switch 17 is released, and no signal is outputted (FIG. 21(B)). In this example, the limit switch 17 is normally turned on and a signal is outputted, and when the limit switch 17 is turned off and no signal is outputted, the water flow detection device A is activated.

Next, an operation of the mechanism shown in FIG. 22 will be described. The mechanism shown in FIG. 22 is normally in a state shown in FIG. 22(A). However, when the valve body 7 not shown in FIG. 22 is released, the end portion 11B of the detection rod 11 tries to rotate downward in FIG. 22 by the effect of the weight (W) 33. However, the rotary damper 18 provided on the rotation shaft 36c of the lever 36 applies a damping force to the rotation movement. Thereby, being separated from the release of the valve body 7, the rotation movement of the lever 36 and the rotation movement of the detection rod 11 that is linked to the rotation movement of the lever 36 become slow. When the lever 36 starts rotating slowly, the end portion 36b of the lever 36 comes into contact with the limit switch 17, a signal is outputted from of the limit switch 17, and the limit switch 17 is actuated (FIG. 22(B)). In this example, the limit switch 17 is normally turned off and no signal is outputted, and when the limit switch 17 is turned on and a signal is outputted, the water flow detection device A is activated.

When the detection rod 11 returns from a state in which the detection rod 11 is tilted as shown in FIG. 22(B) to a state in which the detection rod 11 is horizontal as shown in FIG. 22(A), the lever 36 also returns to a horizontal state by the auxiliary weight 37.

Figure 23:
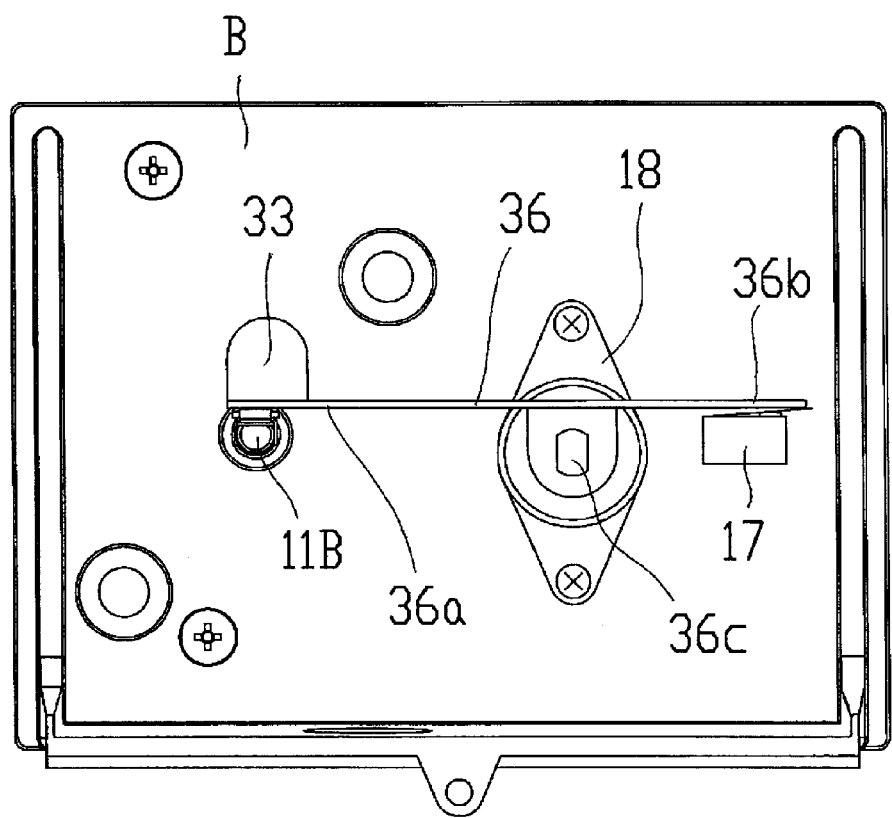
FIG. 23 is a right-cross-sectional view in the housing showing further another embodiment in which a rotary damper is used for the delay mechanism.

The limit switch 17 shown in FIG. 4 can be used as the limit switch 17 shown in FIGS. 21 and 22. A protrusion like the flange F provided on the front end of the detection rod 11 can be provided on the end portions 36a and 36b of the lever 36. Although the detection rod 11 and the lever 36 are provided in alignment with each other, the longitudinal direction of the lever 36 can be different from the longitudinal direction of the detection rod 11. For example, as shown in FIG. 23, the detection rod 11 and the lever 36 can be disposed so that the longitudinal direction of the lever 36 is perpendicular to the longitudinal direction of the detection rod 11 whose end portion 11B is shown in FIG. 23.

The lever 36 in which the rotary damper 18 is provided on the rotation shaft 36c is employed, so that the rotation movement of the detection rod 11 can be slow with respect to the release movement of the valve body 7. If the rotation movement of the detection rod 11 is not slowed down and the detection rod 11 is rotated along with the release of the valve body 7 while the detection rod 11 is in contact with the valve body 7, it is necessary to take measures to reduce the frictional resistance of the end portion 11A of the detection rod 11 in order to secure a smooth movement of the end portion 11A of the detection rod 11 which is in contact with the valve body 7. However, if the lever 36 provided with the rotary damper 18 is employed, it is not necessary to take such measures because the detection rod 11 rotates later than the release of the valve body 7.

Further, there is an advantage that the rotation movement of the lever 36 is easy to understand and the operation of the lever 36 can be easily checked. Furthermore, by using the rotary damper 18, the installation site can be compact.

REFERENCE SIGNS LIST

A Water flow detection device
1 Main body
1a Insertion hole
1b Opening end portion
2 Housing
3 Drain valve
6 Valve seat
7 Valve body
7a Valve main body
7b Convex portion (skirt portion, weight portion)
8 Bearing
9 Valve rod
11 Detection rod
12, 13 Spring seat
14 Coil spring (urging member)
15 Limit switch pressing piece
16 Contact element
17 Limit switch (switch device)
18 Delay mechanism
21 Retainer
22 Extended block
23 Seal member
26, 27 Washer
28 Detection rod
29 Coil spring (urging member)
30 Step portion
31 Cylindrical elastic body (urging member)
32 Magnet (urging member)
33 Weight (urging member)
34 Bellows
36 Lever
36a, 36b End portion
36c Rotation shaft
37 Auxiliary weight

The invention claimed is:

1. A water flow detection device, comprising:
a cylindrical main body connected to a pipe of a fire extinguishing system;
a valve body having a check valve structure provided inside the main body;
a switch device for detecting water flow by a rotation of the valve body and outputting a predetermined signal;
a detection rod having one end and an other end in a longitudinal direction, the other end protruding to the outside of the main body, the one end being provided inside of the main body and in contact with a portion of the valve body inside the main body, the portion being opposite to a bearing of the valve body and rotating in an opening direction, the other end switching ON/OFF of the switch device when the valve body rotates in the opening direction; and
an urging member for biasing the other end of the detection rod to urge the one end of the detection rod in the opening direction of the valve body.

2. The water flow detection device according to claim 1, wherein a protruding skirt portion for forming an orifice-shaped flow passage inside the main body by a rotation of the valve body is provided on a primary side surface of the valve body.

3. The water flow detection device according to claim 2, wherein the skirt portion is in contact with the one end of the detection rod.

4. The water flow detection device according to claim 1, wherein a weight portion for urging the valve body to a closing direction is provided on the valve body.

5. The water flow detection device according to claim 4, wherein the weight portion is a dome-shaped protruding portion formed on a secondary side surface of the valve body.

6. The water flow detection device according to claim 4, wherein the weight portion is formed on the primary side surface of the valve body by the protruding skirt portion for forming an orifice inside the main body.

7. The water flow detection device according to claim 4, wherein the weight portion is made of metal.

8. The water flow detection device according to claim 1, wherein the urging member includes an urging force adjusting unit for urging the detection rod in the opening direction of the valve body.

9. The water flow detection device according to claim 1, further comprising: a rotation restriction portion for restricting a rotation angle of the detection rod to be smaller than a rotation angle of the valve body.

10. The water flow detection device according to claim 1, wherein the detection rod is provided in a primary chamber and a front end of the detection rod is in contact with the valve body.

11. The water flow detection device according to claim 1, further comprising: a lever in which one end is in contact with the detection rod, the other end is in contact with the switch device, and a rotary damper is provided on a rotation shaft located at a center of the lever.

12. The water flow detection device according to claim 1, wherein
the switch device is disposed outside of the main body,
the other end of the detection rod facing the switch device is disposed on the switch device, and
the urging member is disposed to urge the other end of the detection rod facing the switch device.

13. The water flow detection device according to claim 1, the detection rod urges the valve body in a linear movement.

14. The water flow detection device according to claim 1, wherein the one end of the detection rod is in contact with the valve body when closed, and the one end of the detection rod is rotated and released from the valve body in an opening direction of the valve body by urging member when opened.

15. The water flow detection device according to claim 1, wherein
the urging member is held between a pair of spring seats, and
an end surface of each spring seats in a longitudinal direction are facing to each other and in contact with or in a close proximity.

16. The water flow detection device according to claim 15, wherein the portion in contact with the detection rod is a protrusion portion of the valve body, the protrusion portion being protruded from the circumference of the valve body.

17. The water flow detection device according to claim 1, further comprising:
a drain valve provided on a side surface of the main body wherein the detection rod is provided on the side surface of the main body.

18. The water flow detection device according to claim 1, further comprising:
a holder having an inner circumference which the detection rod passes through, the inner circumference being in a taper shape widened toward the main body.

19. The water flow detection device according to claim 1, further comprising:
a retainer having a through-hole which the detection rod passes through, the through-hole being in a taper widened toward the other end of the detection rod.

20. The water flow detection device according to claim 1, wherein the main body has an opening end portion, and
the detection rod comes into contact with the opening end portion.

21. A water flow detection device, comprising:
a cylindrical main body connected to a pipe of a fire extinguishing system, the main body divided into a primary chamber and a secondary chamber;
a valve body having a check valve structure provided inside the secondary chamber;
a switch device for detecting water flow by a rotation of the valve body and outputting a predetermined signal;
a detection rod having one end inside the main body, in contact with a portion of the valve body from a water flow direction, the portion being opposite to a bearing of the valve body and rotating in an opening direction, the detection rod switching ON/OFF of the switch device when the valve body rotates in the opening direction, and the detection rod being in contact with the valve body in a direction from the primary chamber to the secondary chamber; and
an urging member for urging the detection rod in the opening direction of the valve body.

22. The water flow detection device according to claim 21, wherein a protruding skirt portion for forming an orifice-shaped flow passage inside the main body by a rotation of the valve body is provided on a primary side surface of the valve body.

23. The water flow detection device according to claim 21, wherein a weight portion for urging the valve body to a closing direction is provided on the valve body.

24. The water flow detection device according to claim 21, further comprising: a rotation restriction portion for restricting a rotation angle of the detection rod to be smaller than a rotation angle of the valve body.

25. The water flow detection device according to claim 21, wherein the detection rod is provided in a primary chamber and a front end of the detection rod is in contact with the valve body.

26. The water flow detection device according to claim 21, further comprising: a lever in which one end is in contact with the detection rod, the other end is in contact with the switch device, and a rotary damper is provided on a rotation shaft located at a center of the lever.

27. The water flow detection device according to claim 21, the detection rod urges the valve body in a linear movement.

28. The water flow detection device according to claim 21, further comprising:
a retainer having a through-hole which the detection rod passes through, the through-hole being in a taper widened toward the other end of the detection rod.

* * * * *